(12) United States Patent
Kim et al.

(10) Patent No.: US 10,602,304 B2
(45) Date of Patent: *Mar. 24, 2020

(54) REGISTRATION MANAGEMENT METHOD FOR TERMINAL ACCESSING 5G NETWORK ON NON-3GPP ACCESS

(71) Applicant: Samsung Electronics Co., Ltd., Suwon-si, Gyeonggi-do (KR)

(72) Inventors: Sunghoon Kim, Seoul (KR); Youngkyo Baek, Seoul (KR); Hoyeon Lee, Seoul (KR); Jungje Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,508

(22) Filed: Mar. 18, 2019

(65) Prior Publication Data

US 2019/0215645 A1 Jul. 11, 2019

Related U.S. Application Data

(63) Continuation of application No. 15/889,663, filed on Feb. 6, 2018, now Pat. No. 10,237,681.

(30) Foreign Application Priority Data

Feb. 6, 2017 (KR) ................ 10-2017-0016417
Jul. 17, 2017 (KR) ................ 10-2017-0090567

(51) Int. Cl.
*H04W 4/02* (2018.01)
*H04W 60/02* (2009.01)
(Continued)

(52) U.S. Cl.
CPC ............ *H04W 4/02* (2013.01); *H04W 8/02* (2013.01); *H04W 48/16* (2013.01); *H04W 60/02* (2013.01); *H04W 64/003* (2013.01)

(58) Field of Classification Search
CPC ......... H04W 4/00; H04W 12/08; H04W 4/24; H04W 28/0215; H04W 36/033;
(Continued)

(56) References Cited

U.S. PATENT DOCUMENTS 6,757,545 B2 6/2004 Nowak et al.
7,039,430 B2 5/2006 Kang et al.
(Continued)

FOREIGN PATENT DOCUMENTS

KR 10-2006-0043401 A 5/2006
WO 2016/003176 A1 1/2016

OTHER PUBLICATIONS

3GPP, '3rd Generation Partnership Project; Technical Specification Group Services and System Aspects; Study on Architecture for Next Generation System (Release 14)', 3GPP TR 23.799 V1.1.0 (Oct. 2016), pp. 1-501, Oct. 31, 2016, See sections 6.3.10.2.1, 6.3.10.2.3, 8.12.2.
(Continued)

*Primary Examiner* — William D Cumming
(74) *Attorney, Agent, or Firm* — Jefferson IP Law, LLP

(57) ABSTRACT

A communication technique of fusing a fifth generation (5G) communication for supporting higher data transmission rate beyond a fourth generation (4G) system with an Internet of things (IoT) technology and a system thereof is provided. The technique may be applied to an intelligent service (smart home, smart building, smart city, smart car or connected car, health care, digital education, retail business, security and safety related service, or the like) based on the 5G communication technology and the IoT related technology. A method is provided for effectively managing a registration state for a terminal in a 5G core network such as an access and mobility management function (AMF) in a
(Continued)

situation of accessing a 5G network via a non-3rd generation partnership project (3GPP) access.

16 Claims, 20 Drawing Sheets

(51) Int. Cl.
*H04W 48/02* (2009.01)
*H04W 8/02* (2009.01)
*H04W 48/16* (2009.01)
*H04W 64/00* (2009.01)

(58) Field of Classification Search
CPC ... H04W 48/02; H04W 72/082; H04W 60/02; H04W 4/02; H04L 47/12; H04L 67/28
USPC .............. 455/406, 411; 370/229, 235, 328
See application file for complete search history.

(56) References Cited

U.S. PATENT DOCUMENTS

| | | | |
|---|---|---|---|
| 7,383,050 B2 | 6/2008 | Kall et al. | |
| 9,084,143 B2* | 7/2015 | Rubin | H04L 1/0027 |
| 9,107,094 B2* | 8/2015 | Rubin | H04L 67/2842 |
| 9,351,278 B1 | 5/2016 | Oroskar | |
| 9,503,927 B2* | 11/2016 | Rubin | H04W 36/0033 |
| 9,628,976 B2* | 4/2017 | Jeong | H04W 4/24 |
| 9,743,310 B2* | 8/2017 | Rubin | H04W 40/20 |
| 9,942,792 B2* | 4/2018 | Rubin | H04L 1/0027 |
| 9,974,091 B2* | 5/2018 | Rubin | H04W 48/02 |
| 10,080,098 B1 | 9/2018 | Edge | |
| 10,098,044 B2 | 10/2018 | Jeong et al. | |
| 10,142,956 B2 | 11/2018 | Tsai | |
| 10,237,681 B2* | 3/2019 | Kim | H04W 60/02 |
| 2002/0003789 A1 | 1/2002 | Kim et al. | |
| 2003/0148774 A1 | 8/2003 | Naghian et al. | |
| 2004/0180669 A1 | 9/2004 | Kall | |
| 2008/0303901 A1 | 12/2008 | Variyath et al. | |
| 2009/0061898 A1 | 3/2009 | Johnson et al. | |
| 2009/0080359 A1 | 3/2009 | Song et al. | |
| 2010/0041393 A1 | 2/2010 | Kwon et al. | |
| 2011/0294509 A1 | 12/2011 | Kim et al. | |
| 2011/0300807 A1 | 12/2011 | Kwun et al. | |
| 2012/0258766 A1 | 10/2012 | Cho et al. | |
| 2013/0016645 A1 | 1/2013 | Moriwaki et al. | |
| 2013/0150030 A1 | 6/2013 | Lim et al. | |
| 2014/0004824 A1 | 1/2014 | Campagna et al. | |
| 2014/0006786 A1 | 1/2014 | Campagna et al. | |
| 2014/0248901 A1 | 9/2014 | Johnsson et al. | |
| 2014/0341014 A1* | 11/2014 | Kim | H04L 47/12 370/229 |
| 2014/0373124 A1* | 12/2014 | Rubin | H04W 28/0215 726/7 |
| 2014/0376378 A1* | 12/2014 | Rubin | H04L 1/00 370/235 |
| 2015/0079945 A1* | 3/2015 | Rubin | G06F 11/00 455/411 |
| 2015/0281996 A1* | 10/2015 | Rubin | H04W 72/082 370/328 |
| 2015/0373523 A1* | 12/2015 | Jeong | H04W 4/24 455/406 |
| 2016/0105780 A1 | 4/2016 | Hooker et al. | |
| 2016/0345293 A1 | 11/2016 | Diachina et al. | |
| 2016/0345380 A1 | 11/2016 | Diachina et al. | |
| 2017/0034839 A1* | 2/2017 | Rubin | H04B 17/00 |
| 2017/0041968 A1 | 2/2017 | Jin | |
| 2017/0134986 A1 | 5/2017 | Jeong et al. | |
| 2017/0201925 A1 | 7/2017 | Chong et al. | |
| 2017/0251393 A1 | 8/2017 | Cui et al. | |
| 2017/0367002 A1* | 12/2017 | Rubin | H04W 12/08 |
| 2018/0027521 A1 | 1/2018 | Kim et al. | |
| 2018/0041936 A1 | 2/2018 | Kim et al. | |
| 2018/0110029 A1 | 4/2018 | Kim et al. | |
| 2018/0115990 A1 | 4/2018 | Abedini et al. | |
| 2018/0192426 A1 | 7/2018 | Ryoo et al. | |
| 2018/0199160 A1 | 7/2018 | Edge | |
| 2018/0199279 A1 | 7/2018 | Baek et al. | |
| 2018/0199306 A1 | 7/2018 | Edge et al. | |
| 2018/0213505 A1 | 7/2018 | Wang | |
| 2018/0227699 A1* | 8/2018 | Kim | H04W 60/02 |
| 2018/0227933 A1* | 8/2018 | Rubin | H04L 67/2842 |
| 2018/0270782 A1 | 9/2018 | Park et al. | |
| 2018/0309575 A1 | 10/2018 | Nair | |
| 2018/0324740 A1 | 11/2018 | Edge et al. | |
| 2019/0215644 A1* | 7/2019 | Kim | H04W 4/02 |

OTHER PUBLICATIONS

European Search Report dated Aug. 30, 2019; European Appln No. 18747769.0-1218 PCT/KR2018001579.
Korean Office Action dated Nov. 13, 2019, issued in Korean Patent Application No. 10-2017-0090567.

* cited by examiner

FIG. 7

| Slice type | Indicator |
|---|---|
| Slice 1 (e.g. eMBB) | 0 |
| Slice 2 (e.g. mIoT) | 0 |
| Slice 3 (e.g. ULLRC) | 0 |
| Slice 4 (e.g. Critical communications) | 1 |

REGISTRATION MANAGEMENT METHOD FOR TERMINAL ACCESSING 5G NETWORK ON NON-3GPP ACCESS

CROSS-REFERENCE TO RELATED APPLICATION(S)

This application is a continuation application of prior application Ser. No. 15/889,663, filed on Feb. 6, 2018, and was based on and claimed priority under 35 U.S.C. § 119 (a) of a Korean patent application number 10-2017-0016417, filed on Feb. 6, 2017, in the Korean Intellectual Property Office, and of a Korean patent application number 10-2017-0090567, filed on Jul. 17, 2017, in the Korean Intellectual Property Office, the disclosure of each of which is incorporated by reference herein in its entirety.

TECHNICAL FIELD

The disclosure relates to a method for effectively managing a registration state for a terminal in a $5^{th}$ generation (5G) core network such as an access and mobility management function (AMF) in a situation of accessing a 5G network via a non-$3^{rd}$ generation partnership project (3GPP) access.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system.

To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive multiple input and multiple output (MIMO), full dimensional MIMO (FD-MIMO), array antenna, analog beamforming, and large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (COMP), and interference cancellation have been developed. In addition, in the 5G system, hybrid frequency shift keying (FSK) and quadrature amplitude modulation (QAM) modulation (FQAM) and sliding window superposition coding (SWSC) which are an advanced coding modulation (ACM) scheme and a filter bank multi carrier (FBMC), a non-orthogonal multiple access (NOMA), and a sparse code multiple access (SCMA) which are an advanced access technology, or the like have been developed.

Meanwhile, the Internet is evolved to an Internet of things (IoT) network that transmits and receives information between distributed components such as things and processes the information, in a human-centered connection network on which human generates and consumes information. The Internet of everything (IoE) technology in which the big data processing technology, etc., by connection with a cloud server, etc., is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been studied. In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies such as the sensor network, the M2M, the MTC have been implemented by schemes such as the beamforming, the MIMO, the array antenna, or the like. The application of the cloud RAN as the big data processing technology described above may also be considered as an example of the fusing of the 5G communication technology with the IoT technology.

The 5G system has considered a support for various services compared to the existing 4G system. For example, the most representative services are an enhanced mobile broadband (eMBB) communication service, an ultra-reliable and low latency communication (URLLC) service, a massive MTC (mMTC) service, an evolved multimedia broadcast/multicast service (eMBMS), etc. Further, a system providing the URLLC service may be referred to as an URLLC system, a system providing the eMBB service may be referred to as an eMBB system, and a system providing the mMTC service may be referred to as an mMTC system, and the like. In addition, the terms "service and system" may be interchangeably used with each other.

The above information is presented as background information only to assist with an understanding of the disclosure. No determination has been made, and no assertion is made, as to whether any of the above might be applicable as prior art with regard to the disclosure.

SUMMARY

The disclosure relates to a method for effectively managing a registration state for a terminal in an access and mobility management function (AMF) in a situation of accessing a fifth generation (5G) network via a non-3rd generation partnership project (3GPP) access. Since the non-3GPP access is not an access based on a cellular network like WiFi, thus has a registration characteristic different from that of a 3GPP access. For example, in the non-3GPP access, a connected mode may be maintained without an idle mode. Further, a processing in the case in which a terminal moves out of coverage of the non-3GPP or a processing in the case in which registration is performed without a protocol data unit (PDU) session may be different from those of the 3GPP access.

Aspects of the disclosure are to address at least the above-mentioned problems and/or disadvantages and to provide at least the advantages described below. Accordingly, an aspect of the disclosure is to provide a separate management method for registration via a non-3GPP access.

Another aspect of the disclosure is to provide a method for distinguishing slices that are simultaneously serviceable when a user uses a plurality of slices in a 5G mobile communication system.

Another aspect of the disclosure is to provide a method in which a terminal may perform other mobility management procedure without performing a service request by distinguishing a paging message.

In accordance with an aspect of the disclosure, a method of a base station in a wireless communication system is provided. The method includes receiving, from an AMF, a first message requesting location information of a terminal and transmitting, to the AMF, a second message including last known location information of the terminal for the base station and a time stamp associated with the last known location information of the terminal.

In one embodiment, the method further comprises transmitting, to the terminal, a third message for a radio access network (RAN) paging request, receiving, from the terminal, a fourth message including location information of the terminal, and transmitting, to the AMF, a fifth message including the location information of the terminal.

In one embodiment, the location information comprises at least one of a cell identity serving the terminal or tracking area identifier.

In one embodiment, the terminal is in a radio resource control (RRC) inactive state.

In one embodiment, the method further comprises transmitting, to the AMF, a sixth message including information indicating the RRC inactive state of the terminal.

In accordance with another aspect of the disclosure, a method of an AMF in a wireless communication system is provided. The method includes transmitting, to a base station, a first message requesting location information of a terminal and receiving, from the bases station, a second message including last known location information of the terminal for the base station and a time stamp associated with the last known location information of the terminal.

In one embodiment, the method further comprises receiving, from the bases station, a third message including location information of the terminal, and the location information of the terminal is received from the terminal in a RAN paging procedure.

In one embodiment, the location information comprises at least one of a cell identity serving the terminal or tracking area identifier.

In one embodiment, the terminal is in a RRC inactive state.

In one embodiment, the method further comprises receiving, from the bases station, a fourth message including information indicating the RRC inactive state of the terminal.

In accordance with another aspect of the disclosure, a base station is provided. The base station includes a transceiver and a controller configured to control the transceiver to receive, from an AMF, a first message requesting location information of a terminal, and control the transceiver to transmit, to the AMF, a second message including last known location information of the terminal for the base station and a time stamp associated with the last known location information of the terminal.

In accordance with another aspect of the disclosure, an AMF is provided. The AMF includes a transceiver and a controller configured to control the transceiver to transmit, to a base station, a first message requesting location information of a terminal, and control the transceiver to receive, from the bases station, a second message including last known location information of the terminal for the base station and a time stamp associated with the last known location information of the terminal.

According to the disclosure, registration management for a terminal in the AMF may be efficiently performed when the terminal accesses the 5G network via the non-3GPP access, such that it is possible to efficiently manage a resource in the 5G network such as the AMF.

Further, according to the embodiment of the disclosure, information stored in the terminal in the wireless communication system is suggested. Further, the method by which the terminal obtains the corresponding information from the network is suggested. Further, the method by which the message for requesting, by the terminal, use of a slice is configured is suggested. Further, the operation of the network receiving the corresponding request is suggested.

Further, according to the embodiment of the disclosure, the 5G core network may page the terminal so that the terminal performs the mobility management (MM) procedure not requiring establishment of a session.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating information stored in the terminal according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms for identifying an access node, terms referring to network entities, terms referring to messages, terms referring to an interface between network entities, terms referring to various identification information, and the like used in the following description are exemplified for convenience of explanation. Accordingly, the disclosure is not limited by the terms described below, and other terms referring to an object having an equivalent technical meaning may be used. The term "terminal" may be interchangeably used herein with the term "user equipment (UE)." Also, the term "radio access network (RAN)" may be interchangeably used herein with the term "base station," "evolved Node B (eNB)," or "cell."

Hereinafter, for convenience of explanation, in the disclosure, terms and names defined in standards for the fifth generation (5G) system are used. However, the disclosure is not limited by the terms and names, and may be identically applied to systems according to different standards. Further, the non-3rd generation partnership project (3GPP) access may be identically applied to other accesses including an access via WiFi, in addition to an access via 5G.

Embodiment A

Figure 1:
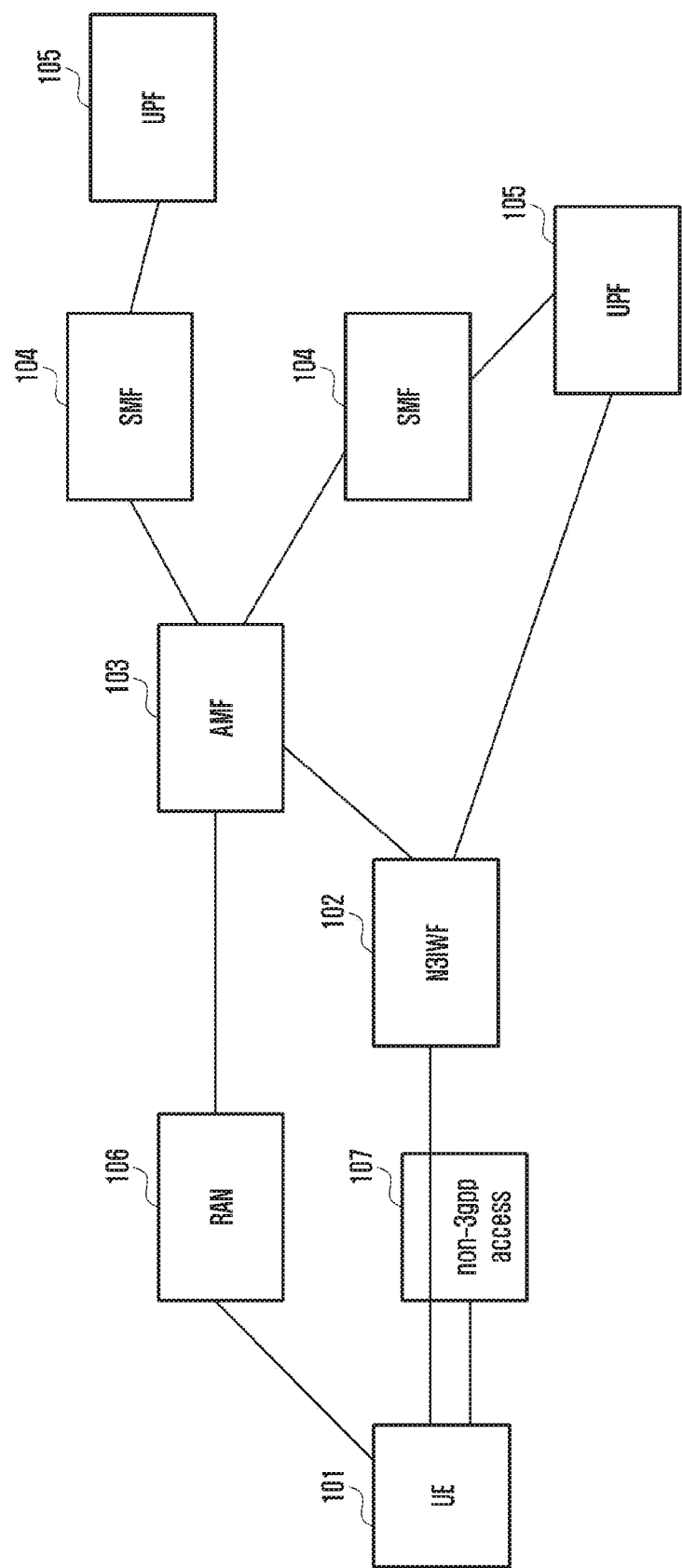
FIG. 1 illustrates an example of a structure in which a terminal accesses a 5th generation (5G) network via a non-3rd generation partnership project (3GPP) access according to an embodiment of the disclosure.

FIG. 1 illustrates an example of a structure in which a terminal accesses a 5G network via a non-3GPP access according to an embodiment of the disclosure.

Referring to FIG. 1, a structure in which a terminal accesses the G network via a 3GPP access and the non-3GPP access to use a common access and mobility management function (AMF) is also illustrated.

FIG. 1 illustrates a case in which the common AMF is selected when the terminal 101 accesses the 5G core network via the 3GPP access, that is, a 5G RAN 106, and at the same time, the terminal access the 5G core network via the non-3GPP access 107. Here, the terminal accesses the 5G core network via the 3GPP access and the non-3GPP access, respectively, and the AMF 103 separately performs registration management with respect to the 3GPP and the non-3GPP.

Here, a non-3GPP interworking function (N3IWF) 102 which is a 5G core network apparatus defined for smooth interworking of the non-3GPP access 107 and the 5G core network, is an entity serving to forward a non-access stratum (NAS) message or data transmitted and received via the non-3GPP access and is also called an ngPDG. A session management function (SMF) 104 is an entity serving to manage a session and allocate an Internet protocol (IP) address to the terminal, and a user plane function (UPF) 105 serves to forward user data according to a control of the SMF.

According to an embodiment of the disclosure, when the AMF performs management for the registration via the non-3GPP access, a registration management method may vary depending on whether or not the corresponding terminal is registered via the 3GPP access.

For example, in the case in which the corresponding terminal is registered via the 3GPP access, even when the terminal does not establish a protocol data unit (PDU) session for the non-3GPP access, since an access servicing the PDU session between the 3GPP access and the non-3GPP access may be changed, the AMF may continuously maintain the registration via the non-3GPP access. However, in the case of the terminal that is not registered via the 3GPP access, there is no need to continuously maintain the registration via the non-3GPP without the PDU session, thus the AMF performs deregistration of the corresponding terminal with respect to the non-3GPP access.

Figure 2:
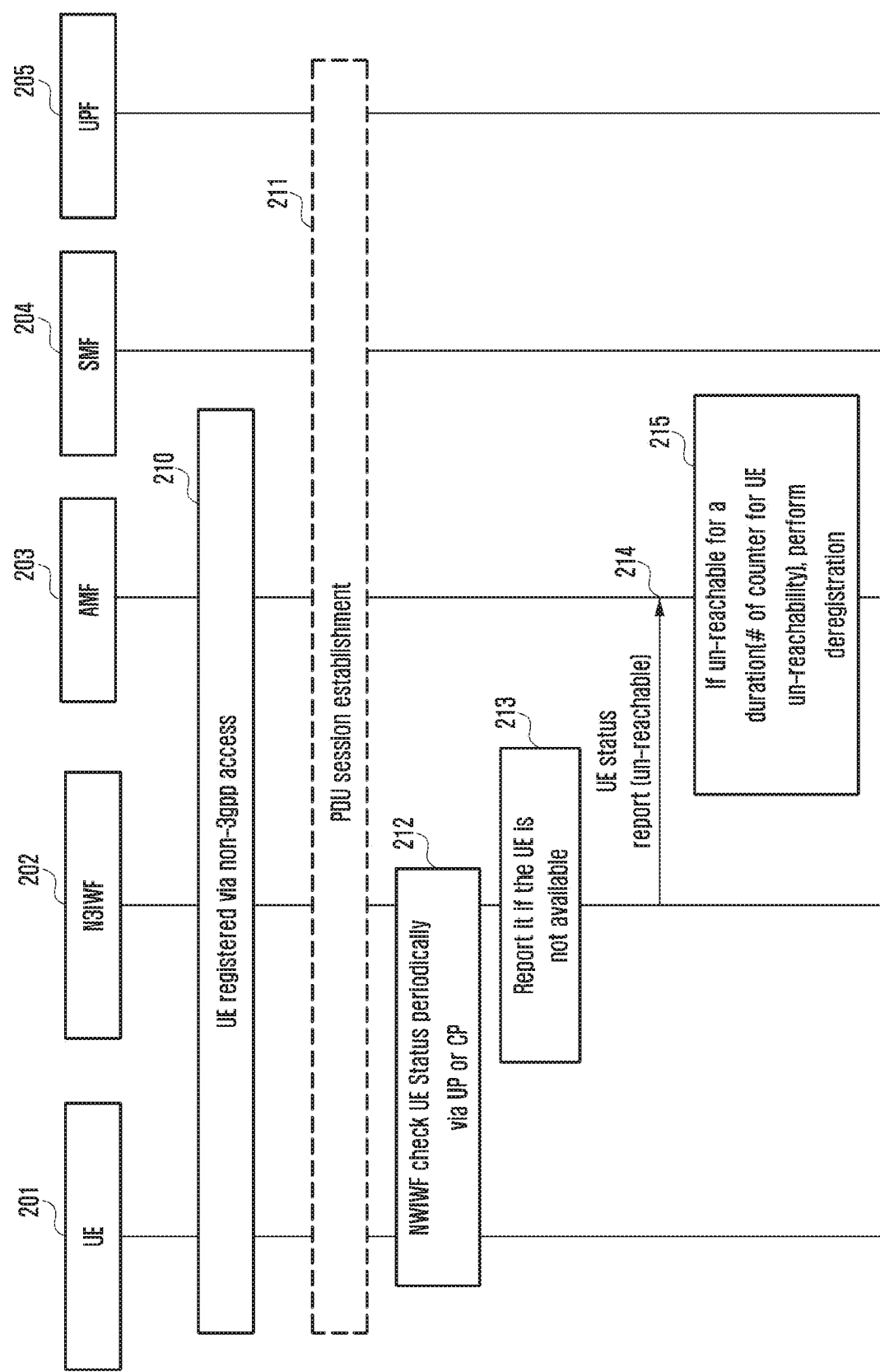
FIG. 2 illustrates a process of performing registration management for a terminal through a report of a non-3GPP interworking function (N3IWF) when accessing the 5G network via the non-3GPP access according to an embodiment of the disclosure.

FIG. 2 illustrates a process of performing registration management for a terminal through a report of the N3IWF when accessing the 5G network via the non-3GPP access according to an embodiment of the disclosure.

A terminal 201 successfully registered to the 5G network via the non-3GPP access in operation 210 may perform a process of establishing a PDU session as needed in operation 211.

Meanwhile, an N3IWF 202 continuously checks whether or not the terminal 201 is available via the non-3GPP access in operation 212, and when the N3IWF 202 determines that the terminal 201 is not available via the non-3GPP access in operation 213, the N3IWF 202 reports the status of the terminal 201 to the AMF 203 in operation 214.

A method for checking, by the N3IWF 202, whether or not the terminal 201 is continuously available via the non-3GPP access will be separately described in detail with reference to FIG. 3.

The AMF 203 receiving the report on the status of the terminal 201 performs the process of deregistration of the terminal 201 in operation 215 when the number of times of receiving the report that the terminal 201 is not available or a duration for which the report that the terminal 201 is not available is received exceeds a specific level, the AMF 203 performs the process of deregistration of the terminal 201 in operation 215.

Figure 3:
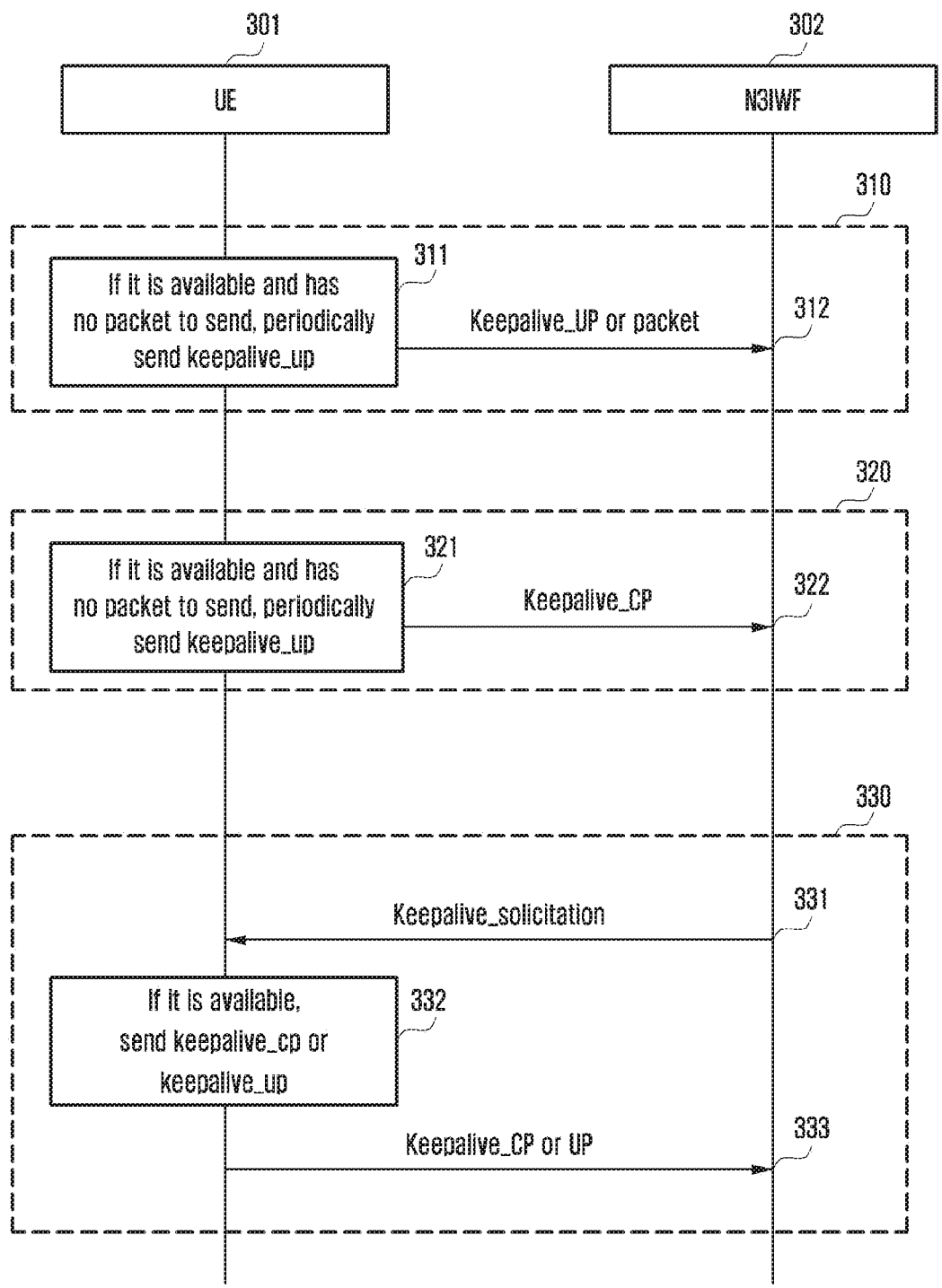
FIG. 3 illustrates a process in which the N3IWF continuously checks whether or not the terminal is continuously available via the non-3GPP access according to another embodiment of the disclosure.

FIG. 3 illustrates a process in which the N3IWF continuously checks whether or not the terminal is available a service via the non-3GPP access according to another embodiment of the disclosure.

Referring to FIG. 3, the check may be performed by using a keepalive message periodically sent by a terminal 301, requesting, by an N3IWF 302, the terminal 301 to send the keepalive message as needed, or the like, and the keepalive message may be sent over a user plane or a control plane.

Block 310 of FIG. 3 is to describe a method in which in the case in which the terminal 301 establishes a PDU session, when the terminal 301 has no packet to send, the terminal 301 periodically sends the keepalive message to the N3IWF 302 over the user plane. Here, in a process of setting up a connection with the N3IWF 302, at which interval the terminal 301 sends the keepalive message over the user plane when a packet is not generated is determined by the terminal 301 using a preset value or a value received from the N3IWF 302. According to the determined period, when the terminal 301 does not send and receive a packet, a timer is set, such that the keepalive message is periodically sent to the N3IWF 302 (operations 311 and 312). When a packet is not sent or the keepalive message is not received for a specific time, the N3IWF 302 recognizes that the terminal 301 is not available via the non-3GPP access, and transmits the status of the terminal to the AMF as in FIG. 2.

Alternatively, when a packet is not sent or the keepalive message is not received for a specific time, the N3IWF 302 performs triggering to send the keepalive message to the terminal 301 as in operation 330 to check the non-3GPP access.

In block 320 of FIG. 3, when the PDU session is not established, whether or not the terminal 301 is available via the non-3GPP access is transmitted to the N3IWF 302 through the keepalive message over the control plane.

In the process in which the terminal 301 sets up a connection with the N3IWF 203, when control signaling transmitted and received by the terminal 301 does not occur, at which interval the keepalive message is sent over the control plane is determined by the terminal 301 using a preset value or a value received from the N3IWF 302. According to the determined period, the terminal 301 sets a timer to periodically send the keepalive message to the N3IWF 302 over the control plane (operations 321 and 322). When the keepalive message is not received for a specific time, the N3IWF 302 recognizes that the terminal 301 is not available via the non-3GPP access, and transmits the status of the terminal to the AMF as in FIG. 2.

Alternatively, when the keepalive message is not received for a specific time, the N3IWF 302 performs triggering to send the keepalive message to the terminal 301 as in operation 330 to check the non-3GPP access.

In block 330 of FIG. 3, the N3IWF 302 directly requests the keepalive message to the terminal 301 over the control plane, and by doing so, checks whether or not the terminal 301 is available via the non-3GPP access.

For example, in the case in which a packet is not sent and received by the terminal 301 or signaling by the terminal 301 does not occur for a specific time, the N3IWF 302 sends a keepalive solicitation message to the terminal 301 (operation 331), and the terminal 301 receives the keepalive solicitation message. When the terminal 301 continuously uses the non-3GPP access (operation 332), the terminal 301 sends the keepalive message to the N3IWF 302 over the control plane (operation 333). When the keepalive message is not arrived at the N3IWF 302 within a specific time in response to the keepalive solicitation message, the N3IWF 302 recognizes that the terminal 301 no more uses the non-3GPP access, and transmits the status of the terminal to the AMF as in FIG. 2.

The N3IWF 302 may indirectly check whether or not the terminal 301 is out of coverage of the non-3GPP access or whether or not the terminal 301 is no more available via the non-3GPP access through access information of the terminal 301 obtained through a non-3GPP access point, without using block 310, 320, or 330 described above.

Figure 4:
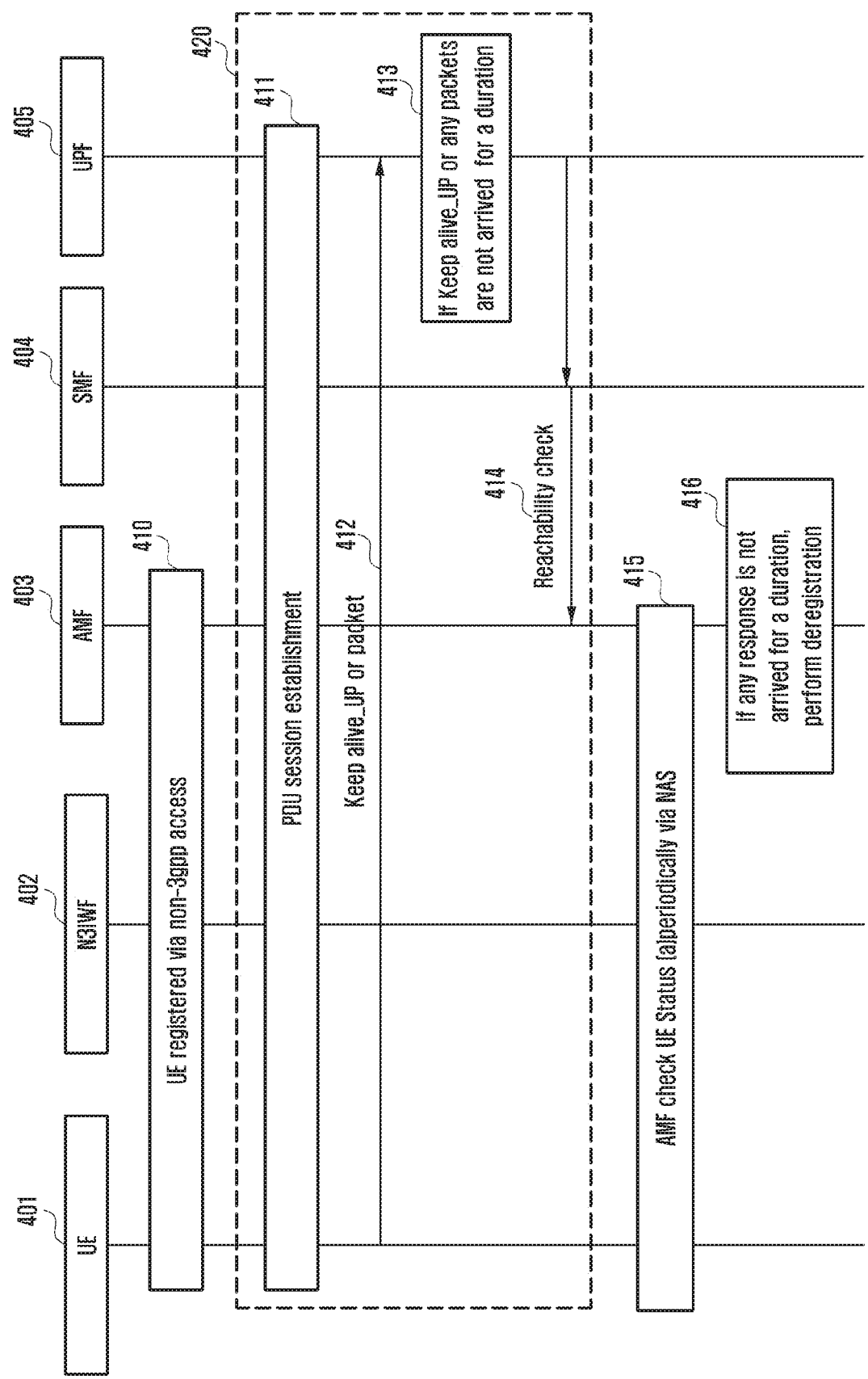
FIG. 4 illustrates a process in which an access and mobility management function (AMF) performs management of registration via the non-3GPP access using information obtained from other core network (CN) node or terminal when accessing the 5G network via the non-3GPP access according to an embodiment of the disclosure.

FIG. 4 illustrates a process in which an AMF performs management of registration via the non-3GPP access using information obtained from other core network (CN) node or terminal when accessing the 5G network via the non-3GPP access according to an embodiment of the disclosure.

A terminal 401 successfully registered to the 5G network via the non-3GPP access in operation 410 may perform a process of establishing a PDU session as needed in operation 411. In the process of establishing the PDU session, an indication that the corresponding PDU session is serviced via the 3GPP access may be transmitted to an UPF 405 through an SMF 404. Alternatively, the UPF 405 may recognize that the PDU session is serviced via the non-3GPP access, from a uniform resource locator (URL), a fully qualified domain name (FQDN) or an address of an N3IWF 402.

A process in which a status of the terminal 401 is reported through the UPF 405 when the PDU session is established is illustrated in block 420.

That is, after establishing the PDU session (operation 411), the terminal 401 sends and receives a packet through the established PDU session. When the terminal 401 has no packet to send, the terminal 401 periodically sends the keepalive message to the UPF 405 over the user plane in operation 412. In the process in which the terminal 401 sets up or registers the PDU session, when the packet is not generated, at which interval the terminal 401 sends the keepalive message over the user plane is determined by the terminal 401 using a preset value or a value received from the 5G core network. According to the determined period, when the terminal 401 does not send and receive the packet, a timer is set, such that the terminal 401 periodically sends the keepalive message to the UPF 405 (operation 412). When the packet is not sent or the keepalive message is not received for a specific time (operation 413), the UPF 405 recognizes that the terminal 413 is not available via the non-3GPP access, and requests the SMF 404 to perform reachability check for the terminal 401, and the SMF 404 transfers the request of the reachability check for the terminal 402 to the AMF 403 (operation 414).

The AMF 403 receiving the request of the reachability check may check whether or not the terminal 401 is continuously available via the non-3GPP access through the terminal 401 and an NAS signaling message.

Further, the AMF 403 continuously checks whether or not the terminal 401 is continuously available via the non-3GPP access (operation 415), and when the number of times of checking that the terminal 401 is not available or a duration for which it is checked that the terminal 401 is not available exceeds a specific level, the AMF 403 performs the process of deregistration of the terminal 401 (operation 416).

A method for continuously checking, by the AMF 403, whether or not the terminal 401 is continuously available via the non-3GPP access will be described in detail with reference to FIG. 5.

Figure 5:
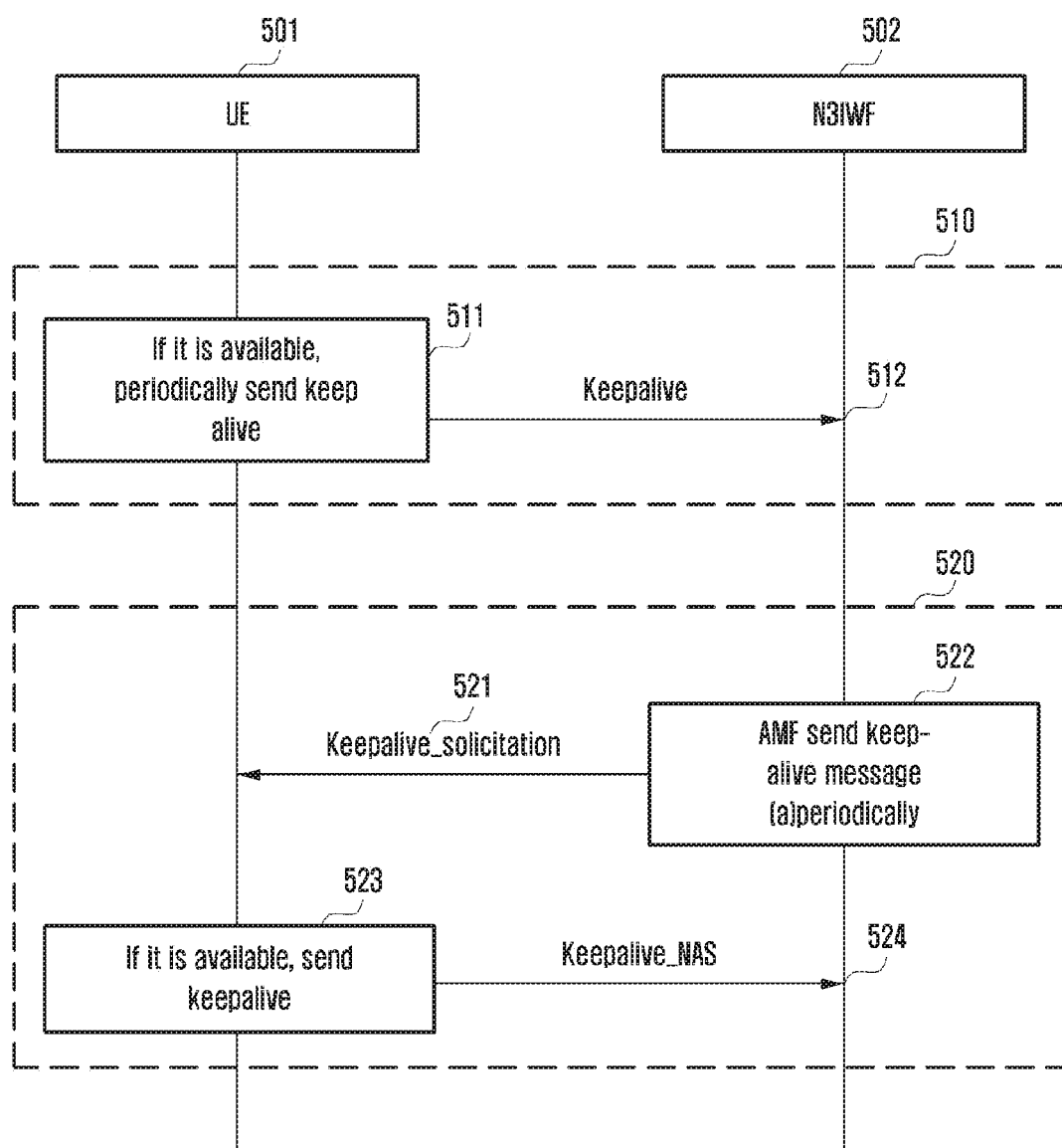
FIG. 5 illustrates a process in which the AMF continuously checks whether or not the terminal is available via the non-3GPP access when there is no protocol data unit (PDU) session for the non-3GPP access according to another embodiment of the disclosure.

FIG. 5 illustrates a process in which the AMF continuously checks whether or not the terminal is available via the non-3GPP access when there is no PDU session for the non-3GPP access according to another embodiment of the disclosure.

Referring to FIG. 5, the check may be performed by using a keepalive message periodically sent by a terminal 501, requesting, by an AMF 502, the terminal 501 to send the keepalive message as needed, or the like, and the keepalive message is sent over the control plane, that is, through the NAS signaling message.

In block 510 of FIG. 5, when the PDU session is not established, whether or not the terminal 501 is available via the non-3GPP access is transmitted to the AMF 502 through the keepalive message through the NAS signaling message.

In the process in which the terminal 501 performs registration with the AMF 502, when control signaling transmitted and received by the terminal 501 does not occur, at which interval the terminal 501 sends the keepalive message over the control plane is determined by the terminal 501 using a preset value or a value received from the AMF 502. According to the determined period, the terminal 501 sets a timer to periodically send the keepalive message to the AMF 502 over the control plane (operations 511 and 512). When the keepalive message is not received for a specific time, the AMF 502 recognizes that the terminal 501 is not available via the non-3GPP access.

Alternatively, when the keepalive message is not received for a specific time, the AMF 502 performs triggering to send the keepalive message to the terminal 501 as in operation 522 to check the non-3GPP access.

In block 520 of FIG. 5, the AMF 502 directly requests the keepalive message to the terminal 501 over the control plane, and by doing so, checks whether or not the terminal 501 is available via the non-3GPP access.

For example, in the case in which a packet is not sent and received by the terminal 501 or signaling by the terminal 501 does not occur for a specific time, the AMF 502 sends a keepalive solicitation message to the terminal 501 (operations 521 and 522), and the terminal 501 receives the keepalive solicitation message. When the terminal 501 continuously uses the non-3GPP access (operation 523), the terminal 501 sends the keepalive message to the AMF 502 over the control plane (operation 524). When the keepalive message is not arrived at the AMF 502 within a specific time in response to the keepalive solicitation message, the AMF 502 recognizes that the terminal 501 no more uses the non-3GPP access.

Embodiment B

Detailed description of embodiments of the disclosure will be made mainly based on communication standards defined by 3GPP. However, the subject matter of the disclosure may also be applied to other communication systems having a similar technical background after a little modification without departing from the scope of the disclosure, and this may be determined by those skilled in the art.

Further, in describing embodiments of the disclosure, a slice, a service, a network slice, a network service, an application slice, an application service, and the like may be mixedly used.

A mobile communication operator may allocate a core network node suitable for a corresponding service for each slice or each set of specific slices.

Figure 6:
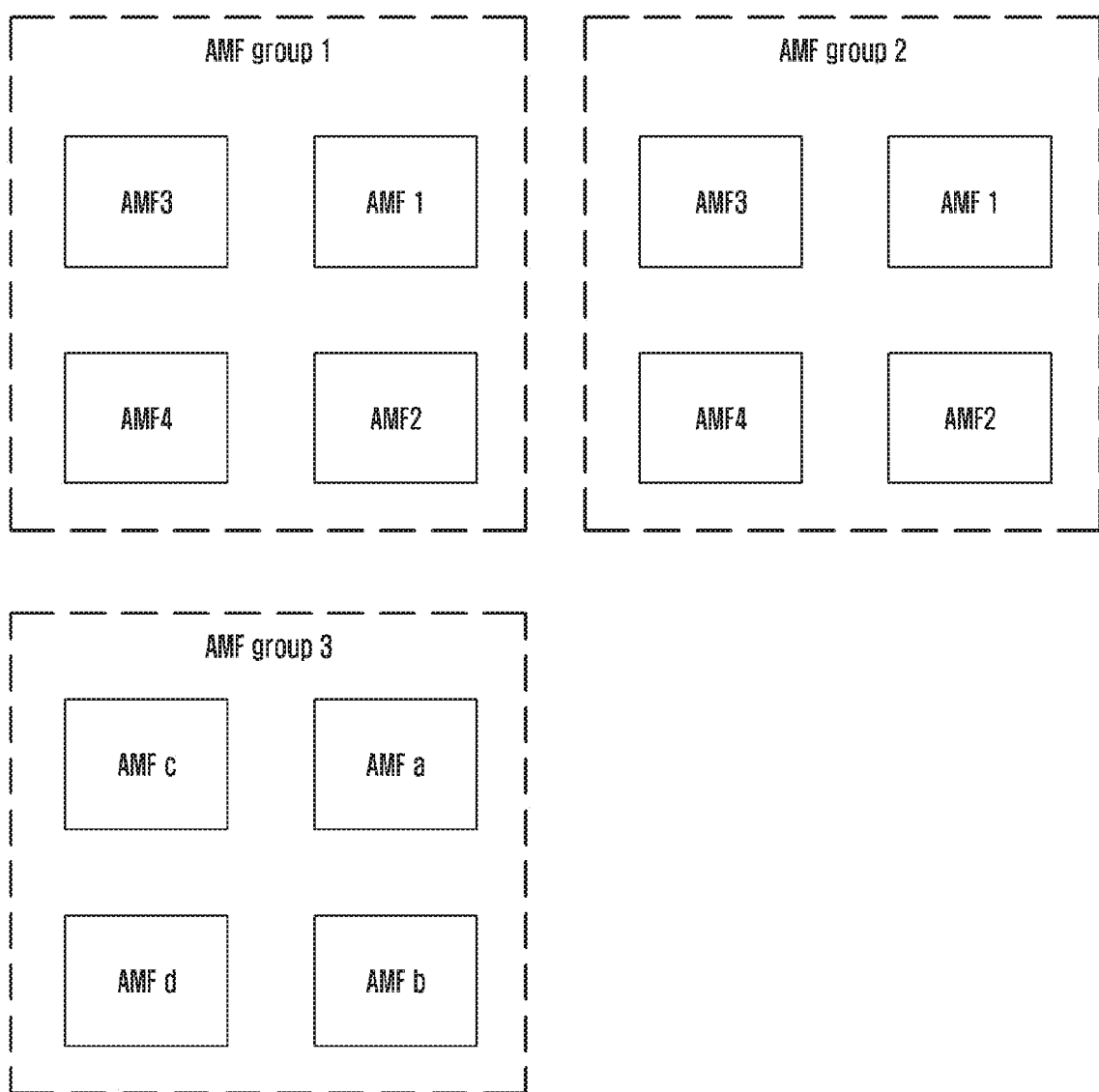
FIG. 6 is a diagram illustrating a network structure according to an embodiment of the disclosure.

FIG. 6 shows an example of a configuration of a corresponding network according to an embodiment of the disclosure.

Referring to FIG. 6, an AMF is a network node managing an access and mobility of a terminal in a 5G mobile communication core network and a name of a corresponding node is in accordance with standard specifications TS 23.501 and TS23.502 defined by 3GPP. The mobile communication operator may set a group of AMFs providing the same service. For example, an AMF group 1 provides slices 1, 2, and 3, an AMF group 2 provides slices 1, 4, and 5, and an AMF group 3 provides a slice 6. AMFs belonging to an AMF group may each have a globally unique ID (e.g., AMF group 3), or may each have a unique ID in the AMF group (e.g., AMF groups 1 and 2).

The terminal stores information of an accessible slice as part of subscription information. The corresponding information is expressed as network slice selection assistance information (NSSAI) or single NSSAI (S-NSSAI) in TS 23.501 and TS 23.502. At this time, an indicator indicating whether or not the corresponding slice needs to be served in a dedicated core network is stored in the terminal together with the slice information.

FIG. 7 shows an example of information stored in the terminal according to an embodiment of the disclosure.

Referring to FIG. 7, a method for obtaining, by the terminal, the corresponding indicator information, various methods may be used. That is, the corresponding indicator information may be stored in a subscriber identification module (SIM) card of the terminal as configuration information. Alternatively, the corresponding information may be obtained from the network using a method such as open mobile alliance device management (OMA DM) when the terminal accesses the network. Alternatively, the corresponding information may be obtained from a policy control function (PCF) (or policy and charging rules function (PCRF)) which is a mobile communication node in charge of policy when the terminal accesses the network. At this time, the PCF may be directly connected with the terminal (direct communication) or may be connected with the terminal via other node (e.g., AMF or network exposure function (NEF))(indirect communication). Alternatively, the network may provide information to the terminal through registration signaling for initial attach of the terminal, tracking area update (TAU), or the like.

When the terminal initially accesses the 5G network, the terminal includes information of a list of slices that the terminal desires to use in a registration message and transmits the registration message to the network. A RAN node checks the slice information, selects an AMF node capable of supporting the corresponding slice(s), and transmits the registration message. At this time, the terminal configures the slice list information based on a table of FIG. 7. That is, the slice list included in the registration message may include slices that may be served by one AMF group, or may include only a slice that needs to be served alone. That is, the list of slices that the terminal desires to use is configured of only the slices that may be served by one common AMF. By doing so, the RAN node receiving the corresponding slice list may select an appropriate AMF. The AMF receiving the registration message checks subscriber information of a user, and checks whether or not a slice requested by the user is available. A finally determined list of slices that may be provided by the current network and match the subscriber information is included in a response to the registration message and transmitted to the terminal. At this time, the AMF may add information of a slice that is not request by the user but may be provided by the corresponding AMF in the list and exists in the user subscription information. The reason is that the user may not know that the corresponding slice may be provided by the same common AMF. The user receiving the message may update the indicator information of FIG. 7.

Figure 8:
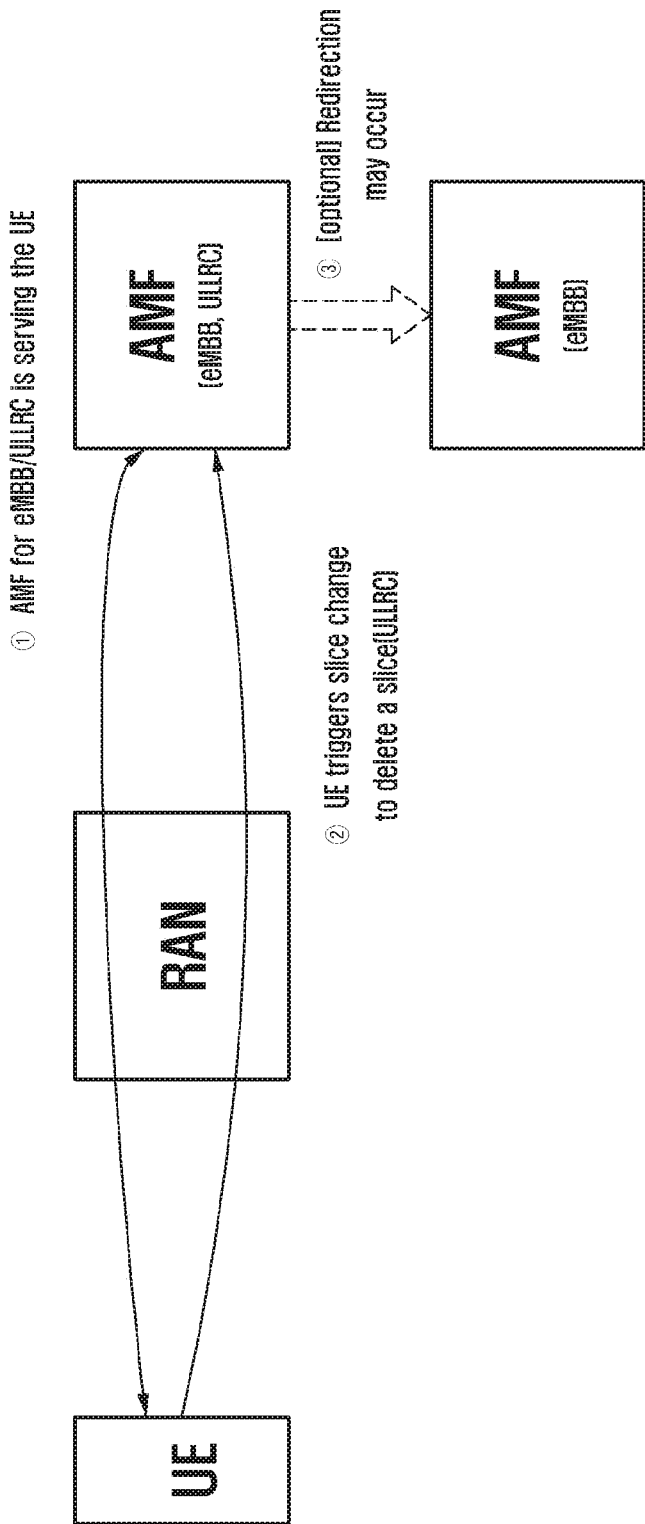
FIG. 8 is a diagram illustrating a scenario in which a changed slice may be provided by the same AMF according to an embodiment of the disclosure.

The terminal initially accessing the network and receiving the slice service through the above-described process may change the slice list determined to be used in registration. At this time, two cases are possible. The first case is a case in which the terminal excludes a slice from or adds a slice to the slice list determined to be used by the terminal, and the added slice is a slice that may be served by the current serving AMF. The terminal may know whether or not the added slice may be served by the same AMF as that of the slices of the current slice list determined to be used based on the indicator information stored in the terminal. In this case, the terminal transmits a slice change request by including a temporary user ID allocated by the serving AMF together with the changed slice list to the RAN. The RAN checks the corresponding information, finds an AMF matching the temporary user ID, and transmits a message. The corresponding process is illustrated in FIG. 8. The AMF receiving the slice change request may determine whether to provide the service by the corresponding AMF or to redirect the message to another AMF.

The second case is a case of changing to a slice that needs to be served by an AMF group different from that of the slice list determined to be used by the terminal. This may also be determined by the terminal based on the indicator information stored in the terminal. In this case, the terminal transmits a slice change request by including a new slice list. Since there is no temporary user ID of the terminal allocated by the existing serving AMF, the RAN checks the corresponding information, finds an AMF that may serve the slice information requested by the terminal, and routes the message. The corresponding process is illustrated in FIG. 9.

FIG. 8 is a diagram illustrating a scenario in which a changed slice may be provided by the same AMF according to an embodiment of the disclosure.

Figure 9:
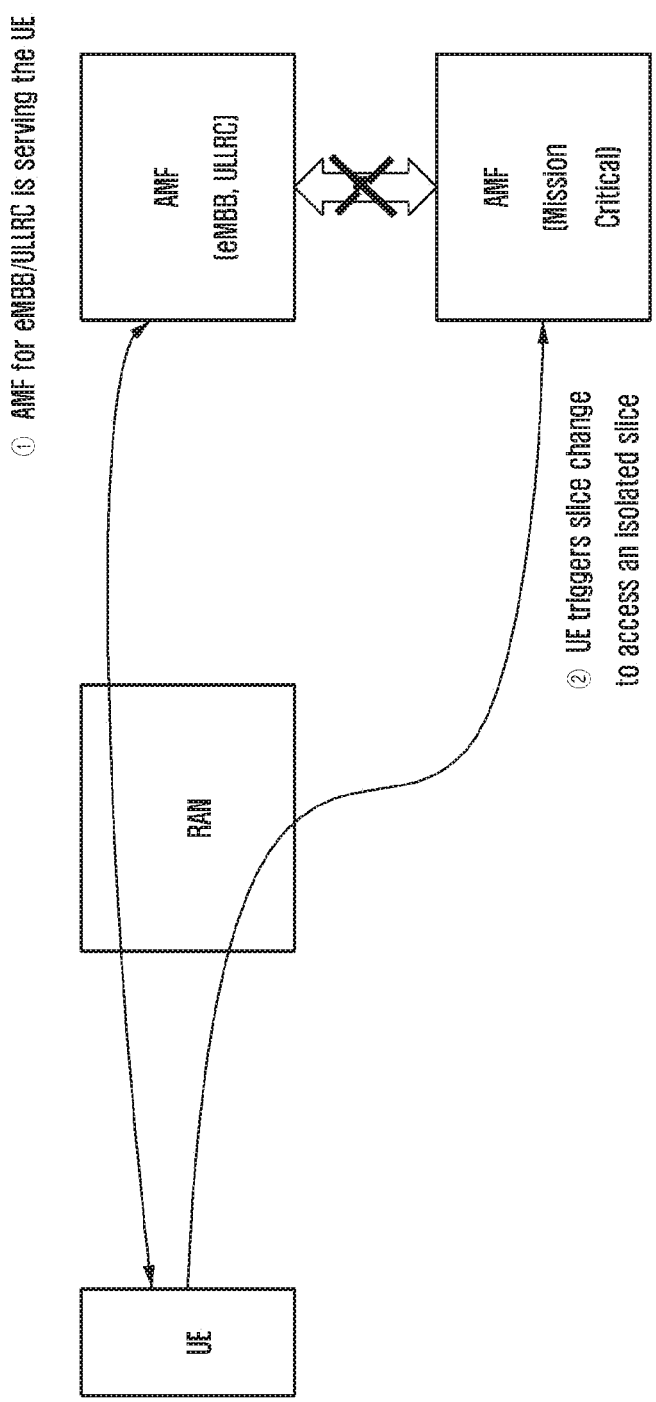
FIG. 9 is a diagram illustrating a scenario in which a changed slice needs to be provided by another AMF according to an embodiment of the disclosure.

FIG. 9 is a diagram illustrating a scenario in which a changed slice needs to be provided by another AMF according to an embodiment of the disclosure.

Figure 10:
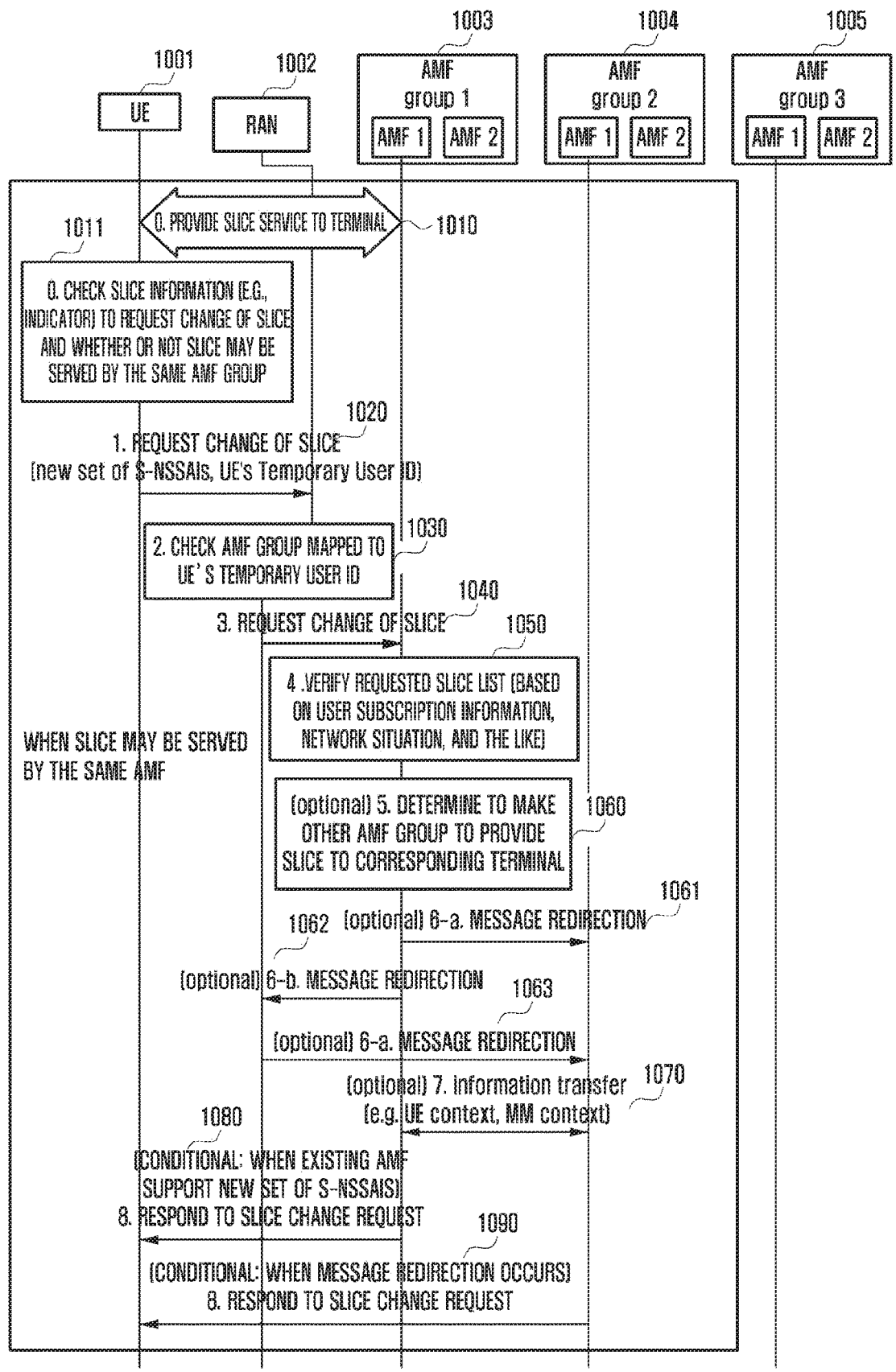
FIGS. 10 and 11 are diagrams illustrating an operation of the terminal and the network and a message flow according to an embodiment of the disclosure.
Figure 11:
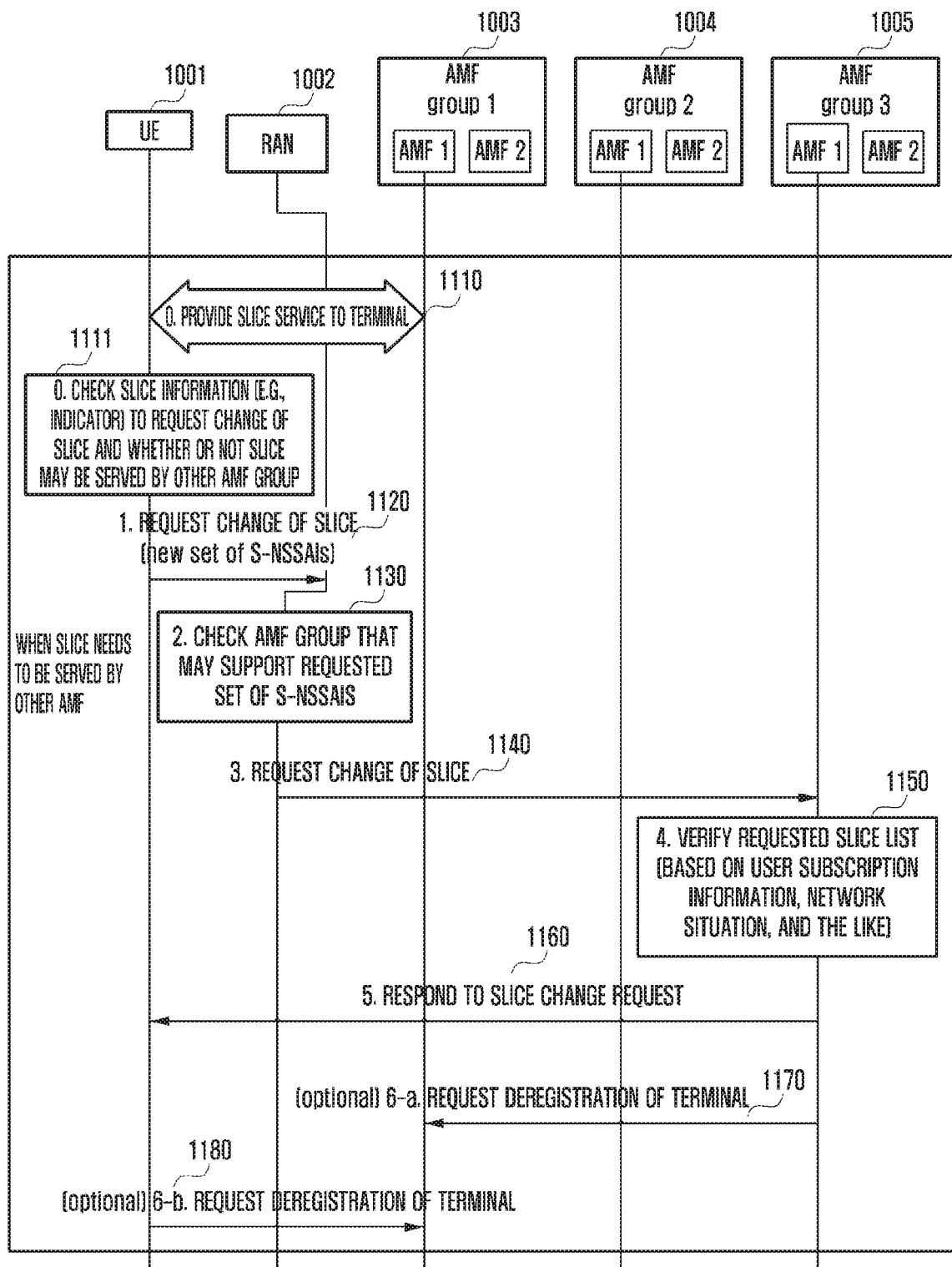

FIGS. 10 and 11 illustrate a message flow of the scenario illustrated in FIGS. 8 and 9 according to an embodiment of the disclosure.

Referring to FIG. 10, an operation in the case in which a changed or added slice may be served by the same AMF is described.

In operation 1010, a terminal 1001 may be receiving a slice service from an AMF 1 included in an AMF group 1 1003. In operation 1011, the terminal 1001 may check slice information to request a change of the slice. For example, the slice information may be the indicator described above. The terminal 1001 may check whether the slice may be served by the same AMF group.

In operation 1020, the terminal 1001 may request a change of the slice to a RAN 1002. At this time, the request message may include information on a set of slices (e.g., new set of S-NSSAIs), a UE's temporary user ID, and the like.

In operation 1030, the RAN 1002 may check an AMF group mapped to the UE's temporary user ID. In operation 1040, the RAN 1002 may request a change of the slice to the AMF 1 of the AMF group 1 1003.

In operation 1050, the AMF 1 of the AMF group 1 1003 may verify the requested slice list. For example, the AMF 1 of the AMF group 1 1003 may verify the requested slice list based on user subscription information, network situation, and the like.

According to an embodiment, in operation 1060, the AMF 1 of the AMF group 1 1003 may determine to make other AMF group to provide a slice to the corresponding terminal. Further, the AMF 1 of the AMF group 1 1003 may transmit message redirection to an AMF 1 of an AMF group 2 1004 in operation 1061. Further, according to an embodiment, the AMF 1 of the AMF group 1 1003 may transmit message redirection to the RAN 1002 in operation 1062, and the RAN 1002 may transmit message redirection to the AMF 1 of the AMF group 2 1004 in operation 1063. Further, according to an embodiment, the AMF 1 of the AMF group 1 1003 and the AMF 1 of the AMF group 2 1004 may transfer information in operation 1070. At this time, the information may include a UE context, a mobility management (MM) context, and the like.

Meanwhile, when the existing AMF (i.e., the AMF 1 of the AMF group 1 1003) supports a new set of S-NSSAIs, the AMF 1 of the AMF group 1 1003 may transmit a response message for the slice change request to the terminal 1001 in operation 1080.

Alternatively, when the message redirection occurs, the AMF 1 of the AMF group 2 1004 may transmit a response message for the slice change request to the terminal 1001 in operation 1090.

Referring to FIG. 11, an operation in the case in which a changed or added slice needs to be served by other AMF is described.

In operation 1110, the terminal 1001 may be receiving a slice service from the AMF 1 included in the AMF group 1 1003. In operation 1111, the terminal 1001 may check slice information to request a change of the slice. For example, the slice information may be the indicator described above. The terminal 1001 may check whether the slice may be served by the same AMF group.

In operation 1120, the terminal 1001 may request a change of the slice to the RAN 1002. At this time, the request message may include information on a set of slices (e.g., new set of S-NSSAIs), and the like.

In operation 1130, the RAN 1002 may check an AMF group that may support the requested set of S-NSSAIs. In operation 1140, the RAN 1002 may request a change of the slice to an AMF 1 of an AMF group 3 1005.

In operation 1150, the AMF 1 of the AMF group 3 1005 may verify the requested slice list. For example, the AMF 1 of the AMF group 3 1005 may verify the requested slice list based on user subscription information, network situation, and the like.

In operation 1160, the AMF 1 of the AMF group 3 1005 may transmit a response message for the slice change request to the terminal 1001 in operation 1170.

According to an embodiment, the AMF 1 of the AMF group 3 1005 may request deregistration of the terminal to the AMF 1 of the AMF group 1 1003. Alternatively, according to an embodiment, the terminal 1001 may request the deregistration of the terminal to the AMF 1 of the AMF group 1 1003 in operation 1180.

Embodiment C

Detailed description of embodiments of the disclosure will be made mainly based on a wireless access network in which 5G network standard is defined by 3GPP, a new RAN (NR) which is a core network, and a packet core (5G system, 5G core network, or next generation core (NG core)). However, the subject matter of the disclosure may also be applied to other communication systems having a similar technical background after a little modification without departing from the scope of the disclosure, and this may be determined by those skilled in the art.

Hereinafter, for convenience of explanation, some terms and names defined in a 3rd generation partnership project (3GPP) standard may be used. However, the disclosure is not limited by the terms and names, and may be identically applied to systems according to different standards.

In a mobile communication service defined in 3GPP, a paging message is used to wake up a terminal in an idle state and provide data communication to the terminal. The existing terminal transmits a service request in response to the paging message, and a core network receiving the message establishes a user plane in addition to a control plane to activate a packet data network (PDN) connection established by the terminal and establish a data radio bearer and a user plane bearer. Therefore, it may be understood that the terminal necessarily establishes a session in response to the paging.

In the 5G system, mobility management and session management are functionally distinguished, and a function of requiring interaction with the terminal only in terms of mobility management regardless of the session has been discussed. For example, mobility restriction area update, periodic registration timer update, location based trigger condition configure, AMF relocation, and the like may be listed. Detailed description for the function will be provided in the disclosure. In order for the terminal to transmit a control signal to an AMF without establishing a session, the paging message needs to be changed from the existing paging message. The reason is that in the case of the existing paging message, the operation is defined so that the service request is necessarily performed to establish a session. Therefore, a method in which the terminal may perform other mobility management procedure without performing a service request by distinguishing a paging message is suggested in the disclosure.

According to another example, in the case of a terminal that may use fourth generation (4G) and 5G, since 4G has wider coverage than 5G, 4G is more suitable for a voice service. Therefore, the terminal may use a voice service in 4G, and use data service in 5G. In the case, when a voice call is arrived at the terminal, the 5G system may make the terminal to fall back to the 4G system so that the terminal uses the voice service. In order to notify the terminal that the fallback to the 4G is required, the 5G system may include an indication that it is a voice call paging in the paging message such that the terminal may fall back to the 4G system.

As another example, there may be a cell that may provide a voice service and a cell that may not provide a voice service in 5G. For example, since a 5G cell using mmWave has narrow coverage, the 5G cell is not suitable for supporting mobility for a voice service, thus may not support a voice function. At this time, the terminal may find other 5G cell supporting the voice function and perform cell reselection. When a voice call is arrived at the terminal, in order to support the above-described operation, an indication that it is a voice call paging may be included in the paging message such that the terminal may select other cell.

According to the disclosure, the 5G core network may page the terminal so that the terminal performs the MM procedure not requiring establishment of a session. The terminal receiving the paging message according to the disclosure may avoid the data radio bearer establishment procedure since a session is not established, and therefore, it is possible to achieve a power saving effect. From the viewpoint of the 5G core network, since an unnecessary session is not established and only an MM procedure required for the terminal may be performed in response to the paging of the terminal, it is advantageous in terms of network signaling. Further, in the case of a terminal intending to use a voice call, the terminal may directly fall back to the 4G system through the paging message or may move to the 5G cell supporting the voice service, thereby saving a voice call setup time.

Detailed description of embodiments of the disclosure will be made mainly based on a wireless access network in which 5G network standard is defined by 3GPP, a NR which is a core network, and a packet core (5G system core network or 5G CN). However, the subject matter of the disclosure may also be applied to other communication systems having a similar technical background after a little modification without departing from the scope of the disclosure, and this may be determined by those skilled in the art.

Hereinafter, for convenience of explanation, some terms and names defined in a 3GPP standard may be used. However, the disclosure is not limited by the terms and names, and may be identically applied to systems according to different standards.

Description for entities described in the disclosure is provided as follows.

A terminal is connected with a RAN and accesses an apparatus performing a mobility management function of a core network apparatus of 5G. In the disclosure, the apparatus is called an AMF. This may refer to a function or an apparatus in charge of both of an access of the RAN and the mobility management of the terminal. The AMF serves to route a session-related message for the terminal to a SMF. The AMF is connected with the SMF, and the SMF is connected with a UPF and allocates a user plane resource to be provided to the terminal to establish a tunnel for transmitting data between a base station and the UPF. The one referred to as AMF in the disclosure may mean a core network apparatus providing mobility management for the terminal, that is, an apparatus receiving an NAS message of the terminal having a different name. For convenience, in the disclosure, the apparatus is called an AMF.

A network slice instance means a service configured of the AMF, the SMF, and the UPF and provided by the network. For example, when a mobile communication operator supports a broadband communication service, a network service satisfying requirements for the broadcast communication is defined and is configured as the network slice instance to provide the service. When the mobile communication operator supports an Internet of things (IoT) service, a network service satisfying requirements for the IoT service is defined and is configured as the network slice instance for IoT to provide the service.

4G means a 4th generation mobile communication system and is configured by a RAN technology which is called long term evolution (LTE) and a core network technology which is called evolved packet core (EPC). 5G means a 5th mobile communication system. The RAN technology of 5G will be referred to as a next generation RAN (NG-RAN) and the core network technology will be referred to as a 5G system core.

A mobility management procedure described in the disclosure includes mobility restriction area update, periodic registration timer update, location based trigger condition configuration, and AMF relocation, and description therefor is provided as follows. It is apparent that other mobility management procedure may also use a new paging message suggested in the disclosure, in addition to the mobility management procedure described by way of example in the disclosure.

A mobility restriction area means a set of information of areas including an allowed area in which data may be transmitted and received by establishing a session according to a location of the terminal, a non-allowed area in which a session may not be established and only control signaling may be performed, and a forbidden area in which all mobile communication services are not available. The 5G system needs to update the mobility restriction area according to a policy of the operator or a change in a mobility pattern of the terminal.

A periodic registration timer means a timer indicating a period of a registration update message transmitted from the terminal to the core network in order to periodically notify reachability of the terminal and notify that the terminal is still registered. When it is expected that the terminal will stay in the same place for a long period of time or there will be no data communication for a long period of time, the 5G system may set the periodic registration timer long to make the registration update period of the terminal long, thereby assisting in power saving of the terminal. Therefore, the 5G system may update the periodic registration timer.

A location based trigger condition means that a condition is set so that when the terminal enters a specific location, a session that may be used at the location is established, accurate location information of the terminal is reported at the location, or registration area update is performed when entering the specific location. The 5G system may set the condition to the terminal, and in the disclosure, this is called location based trigger condition configure, for convenience.

AMF relocation mean a situation in which an AMF which is a network function for managing mobility of the terminal is changed. A case in which a network slice that the terminal may use is changed (e.g., a change in subscription information or a change in a network function on network operation) or a case in which relocation to other AMF needs to be performed due to congestion or occurrence of a failure may occur. At this time, the AMF needs to notify the terminal that the AMF will be relocated, or a newly relocated AMF needs to notify the terminal of the AMF relocation. Therefore, only the AMF relocation is required to be notified without establishing a session.

First Embodiment

Figure 12:
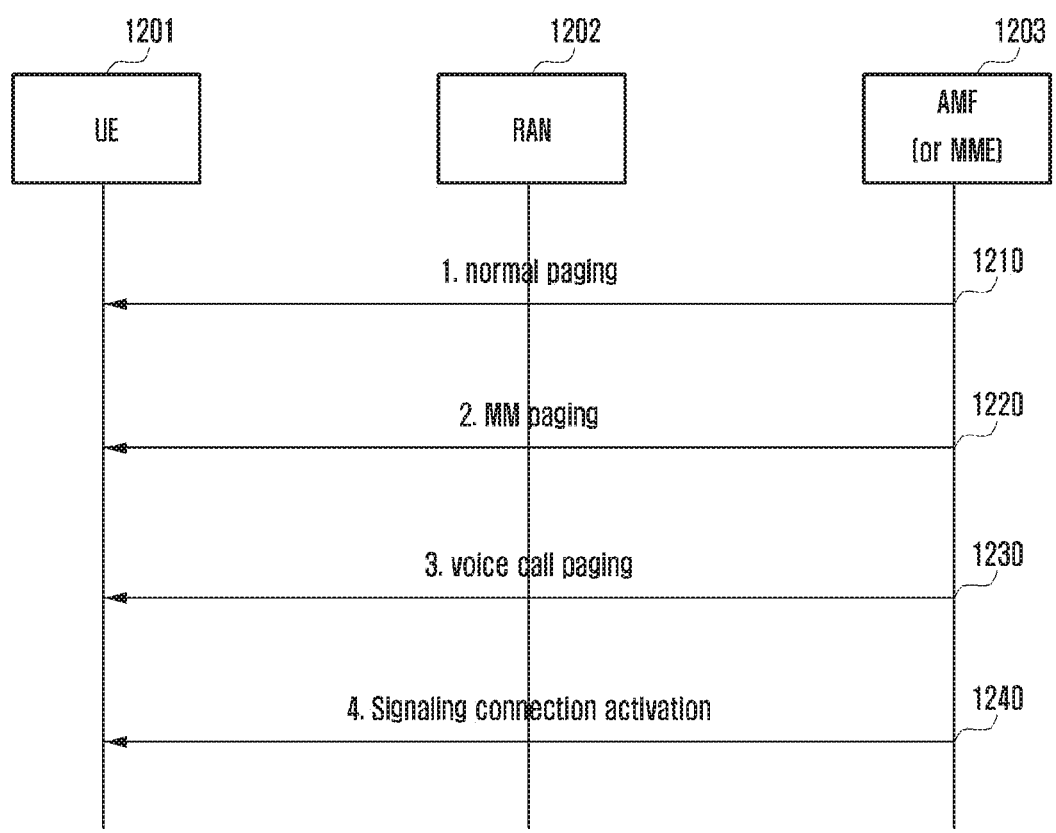
FIG. 12 is a diagram illustrating a kind of paging transmitted from the 5G core network to the terminal according to an embodiment of the disclosure.

FIG. 12 is a diagram illustrating a kind of paging message that may be transmitted from the AMF to the terminal according to an embodiment of the disclosure. In addition to the AMF, the mobility management entity (MME) in change of mobility management in the LTE system may also transmit the paging message.

A first paging message transmitted in operation 1210 is the same as the existing paging message. An ID for the terminal that may be identified by a terminal 1201 and paging area information (e.g., tracking area identifier) that may be identified by a base station are included in the paging message and transferred from an AMF (or MIME) 1203 to a base station 1202, and then transferred from the base station 1202 to the terminal 1201.

A second paging message transmitted in operation 1220 means a paging message for which the terminal 1201 needs not transmit a service request for session establishment in response, unlike the existing paging message. In other word, in response to the first paging message, the terminal 1201 is defined to always transmit a service request, and as a result, a session is established. However, the terminal 1201 receiving the second paging message may not transmit a service request in response but may transmit other MM message in response. Detailed description will be provided in a second embodiment. In the first embodiment, a method for configuring the second paging message is suggested. The AMF 1203 adds an indication to the paging message to notify that the corresponding paging message is paging not requiring establishment of a session. The indication may be an indication that it is paging for mobility management, an indication that session setup is not required, or an indication that a signaling connection is established. The indication is included in the paging message transferred from the base station 1202 to the terminal 1201. The terminal may determine whether the paging message is paging requiring establishment of a session or paging only requiring a signaling connection by checking the paging message including the indication together with the ID for the terminal 1201 through a paging channel.

A third paging message transmitted in operation 1230 is a paging message notifying that a voice call is arrived at the terminal 1201 and the terminal 1201 is required to establish a voice call session, unlike the existing paging message. An operation of the terminal 1201 receiving the message will be described in a third embodiment. In the present embodiment, a method for configuring the third paging message is suggested. The AMF 1203 adds an indication to the paging message to notify that the corresponding paging message is paging by a voice call. The indication may be an indication that a voice call is arrived (mobile terminated (MT) voice call) or an indication that switching to a voice service is required.

A fourth paging message transmitted in operation 1240 is similar to the second paging message, but has a different meaning. The AMF 1203 may transmit paging meaning that a signaling connection is required to the terminal 1201. This does not mean that the MM procedure needs to be necessarily performed, but means that a signaling connection between the terminal 1201 and the AMF 1203 needs to be established and establishment of a session is not required. The terminal may transmit an MM message notifying reachability of the terminal 1201 or a lightened MM message (specific information—MM message including only an ID and a current location of the terminal, and the like) in response thereto.

Second Embodiment

Figure 13:
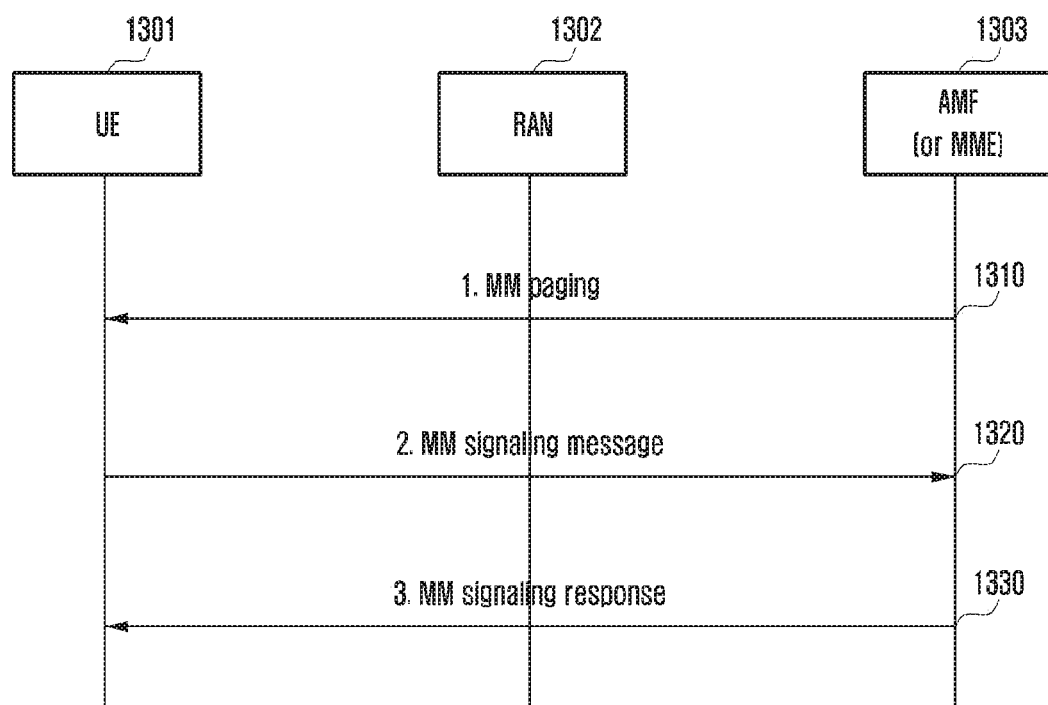
FIG. 13 is a diagram illustrating a mobility management (MM) procedure performed after the terminal receives a paging message containing a meaning that establishment of a session is not required according to an embodiment of the disclosure.

FIG. 13 illustrates an operation when an AMF transmits the second or fourth paging message of the first embodiment and a terminal receives the second or fourth paging message according to an embodiment of the disclosure.

Referring to FIG. 13, the paging message will be referred to as MM paging, for convenience. An AMF 1303 transfers the paging message to the terminal 1301 in operation 1310 when mobility restriction area update, periodic registration timer update, or location based trigger condition configuration is needed or AMF relocation occurs.

The terminal 1301 receives the paging message and then performs an operation as follows in operation 1320. This corresponds to a message 2.

Option 1) Registration update procedure.

The terminal 1301 checks the paging message, determines that it is paging not requiring establishment of a session, and transmits a registration message to the AMF 1303 to establish a signaling connection. The registration message may be a message for updating a registration state of the terminal 1301, or a message for updating, by the terminal 1301, reachability at a current location, and a detail name may be different. The registration message includes an ID for identifying the terminal 1301 by the AMF 1303, information of a mobility restriction area allocated to the terminal 1301, periodic registration timer information, preference of the terminal 1301 for a network service, capability of the terminal 1301, and the like.

Option 2) Transmitting lightened MM signaling.

The terminal 1301 checks the paging message, determines that it is paging not requiring establishment of a session, and transmits a lightened MM message to the AMF 1303 to establish a signaling connection. The lightened MM message means a message including a smaller number of parameters than that of the registration message. The registration message includes the same or similar large amount of information as or to that of the message transmitted at the time of attach of the terminal 1301. The terminal 1301 needs not always transmit the large amount of information, thus the lightened MM message may be used. The lightened MM message may include only some information. For example, the lightened MM message may include an ID for identifying the terminal 1301 by the AMF 1303, current location information of the terminal 1301, and an indication for a parameter requiring update of the terminal. The lightened message may be used by the terminal 1301 only to notify reachability of the terminal 1301, and may be used by the terminal 1301 to establish a signaling connection with the AMF 1303.

Option 3) Service request message without PDU session ID.

The terminal 1301 checks the paging message, determines that it is paging not requiring establishment of a session, and transmits a service request message including an indication that establishment of a session is not required to the AMF 1303 to establish a signaling connection. The AMF 1303 receiving the service request message may determine that it is a service request not requiring establishment of a session and omit an operation of requesting establishment of a session to the SMF. Alternatively, the terminal 1301 may not include a PDU session ID in the service request message or may set a status of the PDU session ID to inactive, and transmit the service request message to the AMF 1303. The AMF 1303 checks the message and when the PDU session ID is not included or the status of the included PDU session ID is set to inactive, may determine that establishment of a session is not required.

The AMF 1303 receives the message for Option 1 or 2 described above, and then may perform a procedure in operation 1330 in response thereto. When the MM paging results from mobility restriction area update, the AMF 1303 performs a procedure for the mobility restriction area update. This may be included in the registration message, or other MM message (e.g., a lightened MM message, a mobility restriction area update message, or an MM message for updating various setting information of the terminal 1301). When the MM paging results from periodic registration timer update, the AMF 1303 performs a procedure for the periodic registration timer update. This may be included in the registration message, or other MM message (e.g., a lightened MM message or an MM message for updating various setting information of the terminal 1301). When the MM paging occurs as a setting of a location based trigger condition for the terminal 1301 is needed, the AMF 1303 transmits a registration message or an MM message for updating setting information of the terminal 1301 including the location based trigger condition to be set to the terminal. When the MM paging results from AMF relocation, the AMF 1303 performs a procedure of notifying the terminal 1301 that AMF relocation occurred. This may be a message to make the terminal 1301 to perform redirection to other AMF, and may be transferred in response to the registration message. Alternatively, since the AMF relocation occurs, a newly allocated AMF receives an MM context of the terminal 1301 from the existing AMF 1303, the existing AMF forwards a message transmitted from the terminal 1301 for Option 1 or 2 to the newly allocated AMF, and the newly allocation AMF transmits a response message to the terminal 1301 in response thereto, such that the terminal 1301 knows that the AMF relocation occurred.

Third Embodiment

Figure 14:
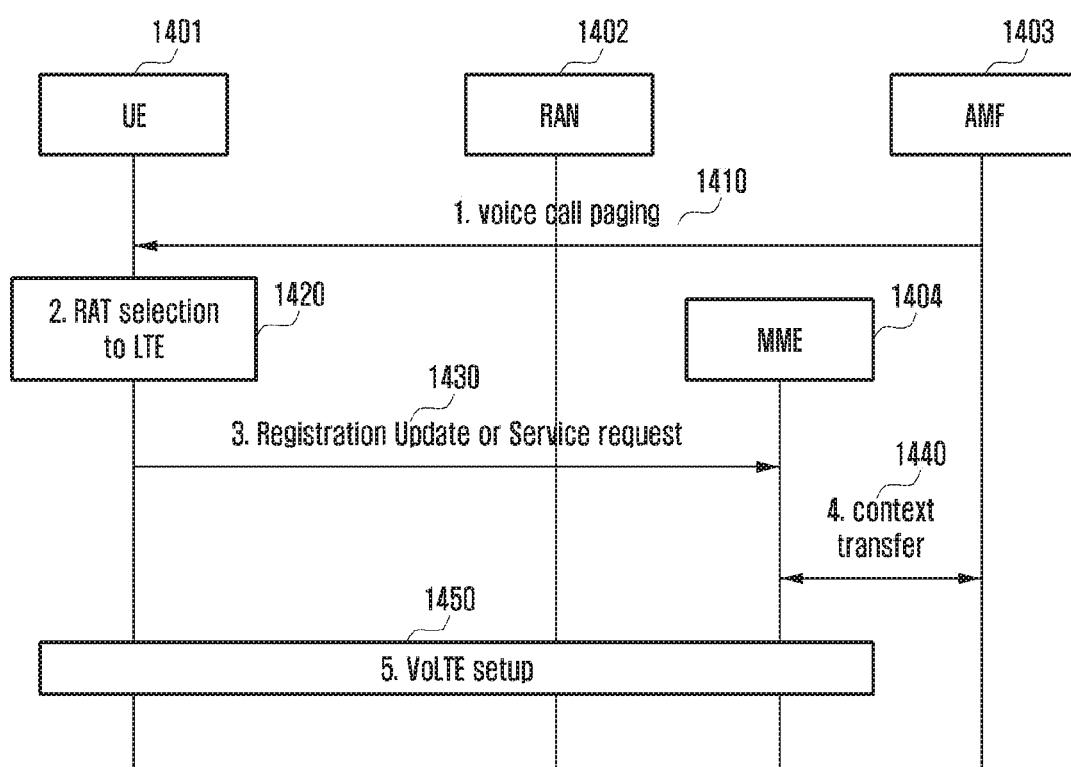
FIGS. 14 and 15 are diagrams illustrating an operation performed after the terminal receives paging for a voice call from the 5G core network according to an embodiment of the disclosure.
Figure 15:
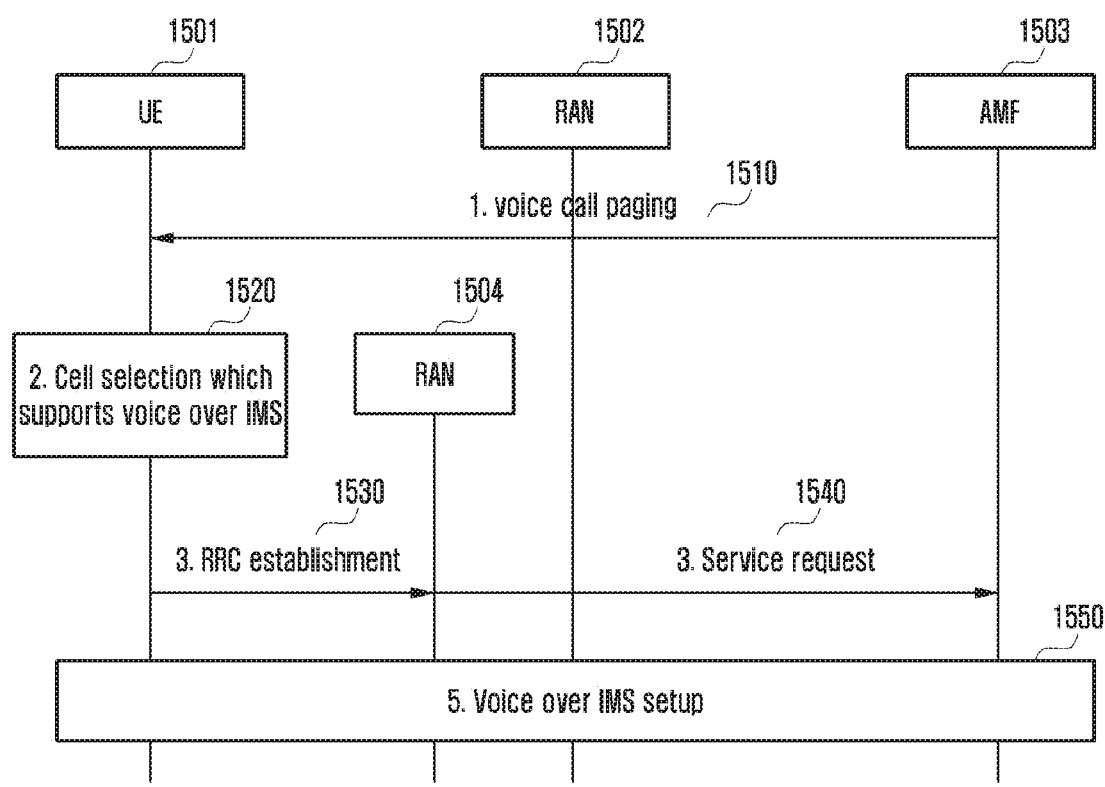

FIGS. 14 and 15 are diagrams illustrating an operation when voice call paging is arrived at a 5G terminal according to an embodiment of the disclosure.

5G terminals 1401 and 1501 may not use a voice service in 5G, and thus may use the voice service by accessing 4G. In this case, 5G may be data centrically operated, and 4G may be voice centrically operated. Alternatively, the terminals 1401 and 1501 may not support a voice service in a specific 5G cell (when it is difficult to support mobility of a voice call due to narrow cell coverage). At this time, the terminals 1401 and 1501 may reaccess a 5G cell that may support a voice service (may support mobility of a voice call due to a specific level or more of cell coverage) to use a voice call service.

FIG. 14 is a diagram illustrating a case in which the terminal 1401 uses 4G for a voice call service.

In operation 1410, the AMF 1403 transmits an indication that voice call paging is arrived at the terminal 1401 according to the second embodiment of the disclosure.

The terminal 1401 receiving the indication performs RAT selection to 4G LTE and cell selection to use a voice call in operation 1420. The terminal 1401 finding an appropriate cell for attach to 4G accesses the corresponding cell in operation 1430, and transmits TAU or a service request to a MME 1404 which is a 4G core network. At this time, an active flag may be marked as 1 in the TAU to indicate that a session connection is required. Alternatively, as a kind of service request, an extended service request may be transmitted to indicate that VoLTE needs to be used.

When a context of the terminal 1401 is required, the MIME 1404 receiving the TAU or service request may receive the context of the terminal 1401 from the AMF 1403 by finding the existing AMF 1403 to which the terminal 1401 attaches in operation 1440. This is performed after checking a temporary ID transmitted from the terminal 1401 to the MIME 1404 and identifying an address indicating the AMF 1403 therein.

The MME 1404 determines that a voice call is arrived at the terminal 1401 and VoLTE needs to be connected through the procedure, and then performs a procedure for VoLTE session setup in operation 1450.

FIG. 15 is a diagram illustrating a case in which the terminal 1501 needs to access other 5G cell for a voice call service.

In operation 1510, the AMF 1503 transmits an indication that voice call paging is arrived at the terminal 1501 according to the second embodiment of the disclosure.

The terminal 1501 receiving the paging may determine whether or not a cell in which the terminal 1501 currently camps support a voice call based on system information broadcasted by the current cell in operation 1520. When the current cell does not support a voice call, the terminal 1501 performs an operation of finding other cell. The terminal 1501 finds a cell supporting a voice call based on the system information, and selects the cell. Then, the terminal 1501 accesses the corresponding cell 1504 in operation 1530, and the terminal 1501 transmits a service request to the AMF 1503. The AMF 1503 receiving the service request determines that the service request resulting from the voice call is received in operation 1540, and establishes a voice call session to the terminal 1501 in operation 1550.

In the disclosure, the voice call service means a voice service using an IP multimedia subsystem (IMS), thus may also be called voice over IMS.

Embodiment D

Detailed description of embodiments of the disclosure will be made mainly based on a wireless access network in which 5G network standard is defined by 3GPP, a NR which is a core network, and a packet core (5G system, 5G core network, or NG core). However, the subject matter of the disclosure may also be applied to other communication systems having a similar technical background after a little modification without departing from the scope of the disclosure, and this may be determined by those skilled in the art. The disclosure covers a continuous operation for a function of reporting a location of a terminal through a home subscriber server (HSS) or a NEF.

The disclosure is mainly based on a wireless access network in which LTE standard is defined by 3GPP, an eNB which is a core network, and an MME, and a service capability exposure function (SCEF) and an HSS used in the LTE system. The disclosure covers a continuous operation for a function of reporting a location of a terminal through an HSS or an SCEF.

Hereinafter, for convenience of explanation, some terms and names defined in a 3GPP standard may be used. However, the disclosure is not limited by the terms and names, and may be identically applied to systems according to different standards.

A new connection mode which called light connection in LTE has been introduced, in which a radio resource control (RRC) state of a terminal is "inactive", but a core network connection state of the terminal is "connected". This is called RRC-inactive in 5G.

As the state of the existing terminal, only an RRC connected state or an RRC idle state has existed. However, occurrence of a large number of signalings was inevitable in order to enter the RRC connected state from the RRC idle state, thus as a method for optimization, a technology in which the terminal may establish an RRC connection with only a very small number of signalings to perform data communication by defining an RRC inactive state or a light connection mode has been defined.

In the light connection mode or RRC active mode (or state), the core network considers that the terminal is in the connected state with respect to the core network, and maintains the user plane and the control plane for the terminal as active. When data for the terminal is generated, the corresponding data is transferred to a base station through a gateway, and the base station finds the terminal through RAN level paging and changes the terminal to be in the RRC connected state to transmit data.

As the technology as described above is introduced, a location reporting service provided by the core network has been affected. The location reporting service of the core network serves to determine a location of the terminal based on a cell ID, a base station ID, or a tracking area (TA) unit and notify the determined location to the outside. In the case of TA, since the MME which is a core network entity or the AMF of the 5G system manages, the MME or the AMF may perform reporting, but in the case of cell ID or base station ID, the current location of the terminal needs to be directly reported. When the terminal is in an idle state, the location of the terminal may be found by paging the terminal, but in the light connection or RRC inactive mode, the core network considers that the terminal is in a connected state, thus paging with respect to the terminal is not performed. Accordingly, while the terminal in the light connection mode or RRC inactive mode freely moves in the RAN paging area, the core network may not find a cell ID or base station ID at which the terminal is actually located, thus may not provide the location reporting service.

The disclosure is to address the above problem.

According to the disclosure, the 5G core network or the MME may provide the location reporting service of reporting the location of the terminal even when the terminal is in the light connection mode or RRC inactive mode. Alternatively, even when the location of the terminal is not identified in real time, an alternative service may be provided by a method of transferring a recent location of the terminal.

Description for entities described in the disclosure is provided as follows.

A terminal is connected with a RAN and accesses an apparatus performing a mobility management function of a core network apparatus of 5G. In the disclosure, the apparatus is called an AMF. This may refer to a function or an apparatus in charge of both of an access of the RAN and the mobility management of the terminal. The AMF serves to route a session-related message for the terminal to a SMF. The AMF is connected with the SMF, and the SMF is connected with a UPF and allocates a user plane resource to be provided to the terminal to establish a tunnel for transmitting data between a base station and the UPF. The one referred to as AMF in the disclosure may mean a core network apparatus providing mobility management for the terminal, that is, an apparatus receiving an NAS message of the terminal having a different name. For convenience, in the disclosure, the apparatus is called an AMF. This corresponds to the MME of the 4G system. NEF is an abbreviation for NEF, and serves to expose capability of the 5G network to an external network. For example, when the location of the terminal is requested by the external network, the location of the terminal is requested through the NEF, and the NEF queries the location of the terminal. The AMF notifies the NEF of the location of the terminal, and the NEF again sends the location of the terminal to the external network requesting the location of the terminal. This corresponds to the SCEF of the 4G system.

In the disclosure, the AMF may be substituted with the MME of 4G, and the NEF may be substituted with the SCEF of 4G.

First Embodiment

Figure 16:
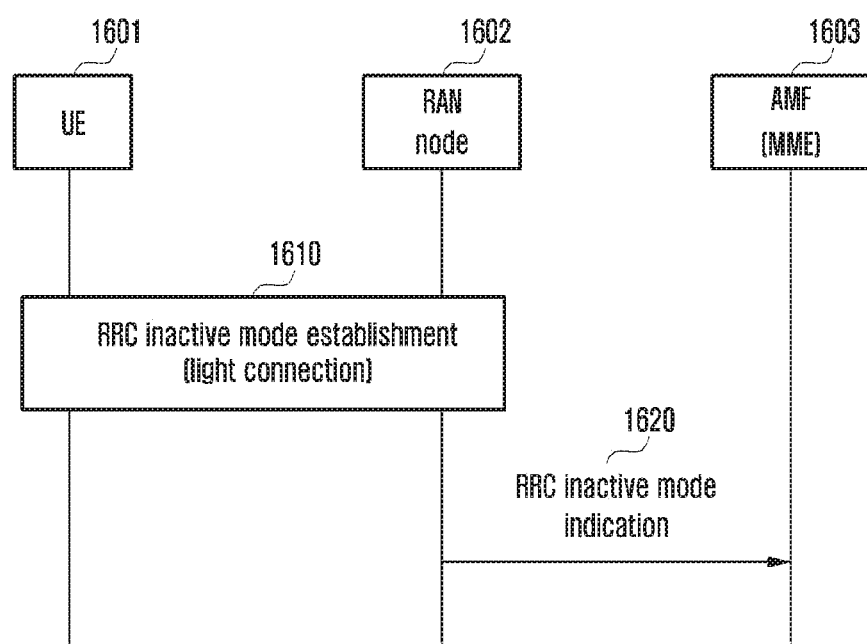
FIG. 16 is a diagram illustrating an operation in which a base station notifies the core network (AMF or mobility management entity (MME)) that the terminal entered a radio resource control (RRC) inactive mode or a light connection mode according to an embodiment of the disclosure.

FIG. 16 is a diagram illustrating an operation in which a base station notifies the AMF that the terminal entered an RRC inactive (or a light connection) mode according to an embodiment of the disclosure.

Referring to FIG. 16, an AMF 1603 may know whether or not a terminal 1601 supports an RRC inactive (or light connection) mode when the terminal 1601 accesses a network and performs registration. The terminal 1601 may perform marking on an information field called UE radio capability in a registration message (attach, TAU, or registration update) to indicate that the terminal 1601 supports the RRC inactive (or light connection) mode. The AMF 1603 receiving this may recognize and reflect to the subsequent operation the support of the RRC inactive (or light connection) mode of the terminal 1601. Alternatively, when the AMF 1603 determines that the terminal may not use the RRC inactive (or light connection) mode based on subscription information of the terminal 1601 or a network policy for the terminal 1601, the AMF 1603 may notify the terminal 1601 that the RRC inactive (or light connection) mode may not be used. In order to notify the above fact, the AMF 1603 may release the marking of the RRC inactive (or light connection) mode on the information field called UE radio capability when transmitting a response to the registration message to the terminal 1601, or the AMF 1603 may transfer a cause value that "the RRC inactive (or light connection) mode is not allowed".

The terminal 1601 using the RRC inactive (or light connection) mode may enter the RRC inactive mode (or light connection) mode through negotiation with a base station 1602 in operation 1610. In operation 1620, the base station 1602 may notify the AMF 1603 that the terminal 1601 currently entered the RRC inactive (or light connection) mode, and the base station 1602 will manage reachability and mobility of the terminal 1601, when the terminal 1601 entered the RRC inactive (or light connection) mode. To this end, the base station 1602 transfer an RRC inactive mode indication or light connection indication to the AMF (or MME) 1603. The name of the message may be replaced with a different name, but components of the message includes an identifier indicating that the terminal 1601 entered the RRC inactive (or light connection) mode, the base station will manage the reachability and mobility of the terminal 1601, or the base station 1602 will perform RAN level paging. The AMF 1603 receiving the message knows that the terminal 1601 currently in a CN-connected (connected state in the viewpoint of the core network) state entered the RRC inactive (or light connection) mode. The base station 1602 may also notify the AMF (or MME) 1603 of the current location of the terminal 1601 through the message. For example, the base station 1602 may notify the AMF (or MME) 1603 of information (cell ID list or RAN ID list) on a cell ID or a region for managing mobility of the terminal 1601 in the base station 1602.

Second Embodiment

Figure 17:
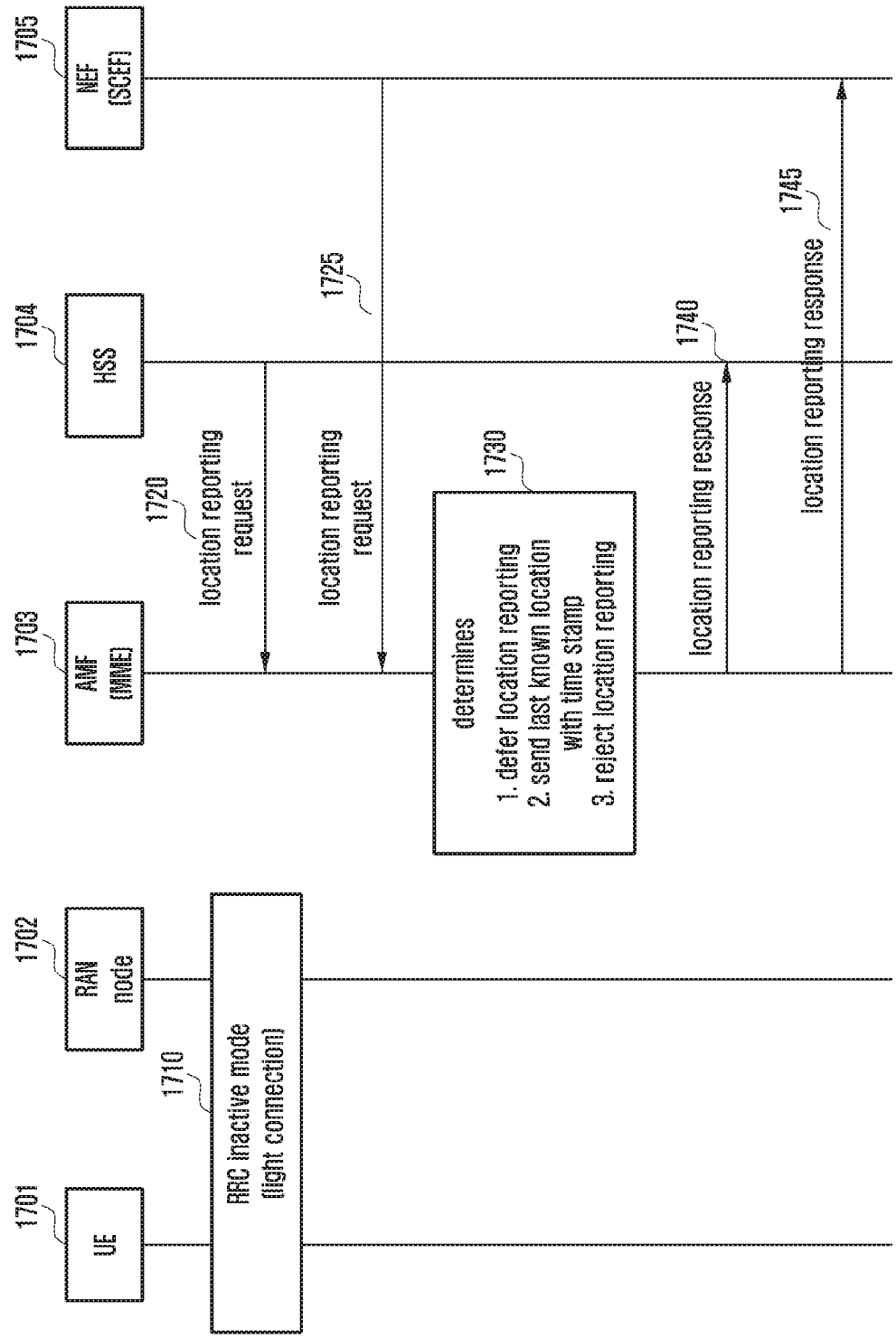
FIG. 17 is a diagram illustrating a method for processing location reporting of the terminal requested by a home subscriber server (HSS), a network exposure function (NEF), or a service capability exposure function (SCEF) since the terminal is in the RRC inactive mode or the light connection mode according to an embodiment of the disclosure.

FIG. 17 is a diagram illustrating a method for processing a location reporting request transmitted from an HSS or NEF according to an embodiment of the disclosure.

Referring to FIG. 17, an HSS 1704 may trigger an AMF 1703 to report a location of a terminal 1701 as part of lawful interception. Alternatively, an NEF 1705 may be set to notify the location of the terminal 1701 according to a network capability exposure setting with a $3^{rd}$ party application. When the $3^{rd}$ party application requests the location of the terminal 1701 to the NEF 1705, the NEF 1705 transmits a message for requesting the location of the terminal 1701 to the AMF 1703. Alternatively, the NEF 1705 may transmit a message for requesting event reporting for the location of the terminal 1701 to the AMF 1703. Then, the AMF 1703 notifies the NEF 1705 of the location of the terminal 1701 every time the location of the terminal 1701 is changed. At this time, granularity of the location of the terminal 1701 requested by the HSS 1704 or NEF 1705 may be a cell ID or RAN ID. When the granularity of the location of the terminal 1701 is a tracking area, the AMF 1703 may transfer a tracking area in which the terminal 1701 is located regardless of whether or not the terminal 1701 is in the RRC inactive (or light connection) mode. The present embodiment describes an operation when the AMF 1703 receives a request to report a cell ID or base station ID which is location information of the terminal 1701 managed by the base station 1702.

In the operation of FIG. 17, it is assumed that the terminal 1701 is in the RRC inactive (or light connection) mode (operation 1710).

The AMF 1703 checks whether the corresponding terminal 1701 is in the RRC inactive (or light connection) mode when receiving a request to report the location of the terminal 1701 from the HSS 1704 or NEF 1705 in operation 1720 or 1725. Even when the base station 1702 does not notify that the terminal 1701 entered the RRC inactive (or light connection) mode, in the case in which the terminal 1710 notifies the AMF 1703 of capability for the RRC inactive (or light connection) mode when performing registration, the AMF 1703 may guess that the terminal 1701 is in the RRC inactive (or light connection) mode. Alternatively, the AMF 1703 may determine that the corresponding terminal 1701 is in the RRC active (or light connection) mode when the terminal 1701 having capability for the RRC inactive (or light connection) mode stays in the CN-connected state for a specific time or longer. Alternatively, the AMF 1703 may not know that the terminal 1701 is in the RRC inactive mode at all. Accordingly, the AMF 1703 may perform one of the following operations in operation 1730.

Option 1. The AMF 1703 defers the location reporting.

This only corresponds to the case in which the AMF 1703 knows that the terminal 1701 is in the RRC inactive mode. The AMF 1703 may defer the location reporting until the terminal 1701 transmits an NAS message. The AMF 1703 may not know the current location of the terminal 1701 until the terminal 1701 transmits the next NAS message, thus may defer the location reporting until obtaining a cell ID and RAN ID included in an N2 message from the base station 1702 including the NAS message transmitted from the terminal 1701. In this case, the AMF 1703 may transmit a response that the AMF 1703 defers the location reporting of the terminal 1701 in response to the location reporting to the HSS 1704 or NEF 1705 in operation 1740 or 1745. Alternatively, the AMF 1703 may transfer a cause value that the location reporting needs to be deferred since the terminal is in the RRC inactive (or light connection) mode. Then, when the terminal 1701 transmits the NAS message and the location of the terminal 1701 is identified, the AMF 1703 transmits location information of the terminal 1701 to the HSS 1704 or NEF 1705 to complete the location reporting operation.

Option 2. The AMF 1703 sends a last known location of the terminal 1701 to the HSS 1704 or NEF 1705. At this time, information of time at which the corresponding location is identified is transferred together. This may also be applied even when the AMF 1703 does not know that the terminal 1701 is in the RRC inactive mode.

The AMF 1703 stores the location information of the terminal 1701 at that time through the NAS message previously transmitted from the terminal 1701 and the N2 message from the base station 1702 transferring the corresponding NAS message. When receiving a request to report the location information of the terminal from the HSS 1704 or NEF 1705 and determining that the terminal 1701 is currently in the RRC inactive (or light connection) mode, the AMF 1703 may send the last known location of the terminal 1701 to the HSS 1704 or NEF 1705 in operation 1740 or 1745. Alternatively, even when the AMF 1703 does not know that the terminal 1701 is currently in the RRC inactive state, since the terminal 1701 is in the CN-connected state, according to the disclosure, the AMF 1703 may send the last known information (cell ID or base station ID) of the terminal 1701 that the AMF 1703 knows to the HSS 1704 or NEF 1705. According to the disclosure, when the AMF 1703 sends the last known location information to the HSS 1704 or NEF 170, a time (time stamp) at which the last known location is identified is sent together, thereby notifying how old the location information is. The location information and the time information are sent to the $3^{rd}$ party application through the NEF 1705, and the $3^{rd}$ party application may determine accuracy of the location information based thereon. After receiving the information, if the information is insufficient, the 3rd party application may attempt to obtain the location of the terminal 1701 through other methods. Alternatively, when the HSS 1704 requests the location of the terminal 1701, the information is transferred to the HSS 1704, and the HSS 1704 may store the last known location of the terminal 1701 and the time (time stamp) at which the corresponding location is identified together, and sends them to a location management server.

When the AMF 1703 stores the cell ID list of cells to which the terminal 1701 may move or the RAN ID list (candidates list of cell ID or RAN node ID) transferred from the base station 1702, the information may be transferred to the location reporting to report an approximate location of the terminal 1701.

Option 3. The AMF 1703 notifies the HSS 1704 or NEF 1705 that the location reporting is failed, and notifies that the reason is that the terminal 1701 is in the RRC inactive (or light connection) mode. This only corresponds to the case in which the AMF 1703 knows that the terminal 1701 is in the RRC inactive mode.

The AMF 1703 notifies the NEF 1705 that the location reporting is failed, that is, the cell ID of the cell in which the terminal 1701 is currently located or the base station ID may not be notified since the terminal 1701 is in the RRC inactive (or light connection) mode in operation 1745. At this time, it is possible to notify that the location of the terminal 1701 may not be identified, or the terminal 1701 is in the RRC inactive (or light connection) mode through a cause value. The NEF 1705 transfers this to the $3^{rd}$ party application, and the $3^{rd}$ party application may identify the location of the terminal 1701 using other methods.

In the present embodiment, when receiving a base station ID as the last known location, the AMF 1703 may interpret the base station ID as a geographical region, that is, a zip code, a postal code, or global positioning system (GPS) information and transfer the interpreted information to the NEF 1705, and the NEF 1705 may transfer the interpreted information to a $3^{rd}$ party application server. As another example, when the AMF 1703 identifies the last known location as a candidates list of cell ID, an intermediate value of the cell location may be derived as a geographical region information value and transferred to the NEF 1705 or HSS 1704. As another example, the AMF 1703 sends the last known location to the NEF 1705 or HSS 1704, and the NEF 1705 or HSS 1704 may interpret the corresponding information as geographical region information (e.g., zip code, postal code, civic address, and GPS information). This is to hide the cell or base station ID used in the network from an external $3^{rd}$ party. The NEF 1705 or HSS 1704 may transfer the geographical region information mapped as described above to the $3^{rd}$ party application or the location management server.

Third Embodiment

Figure 18:
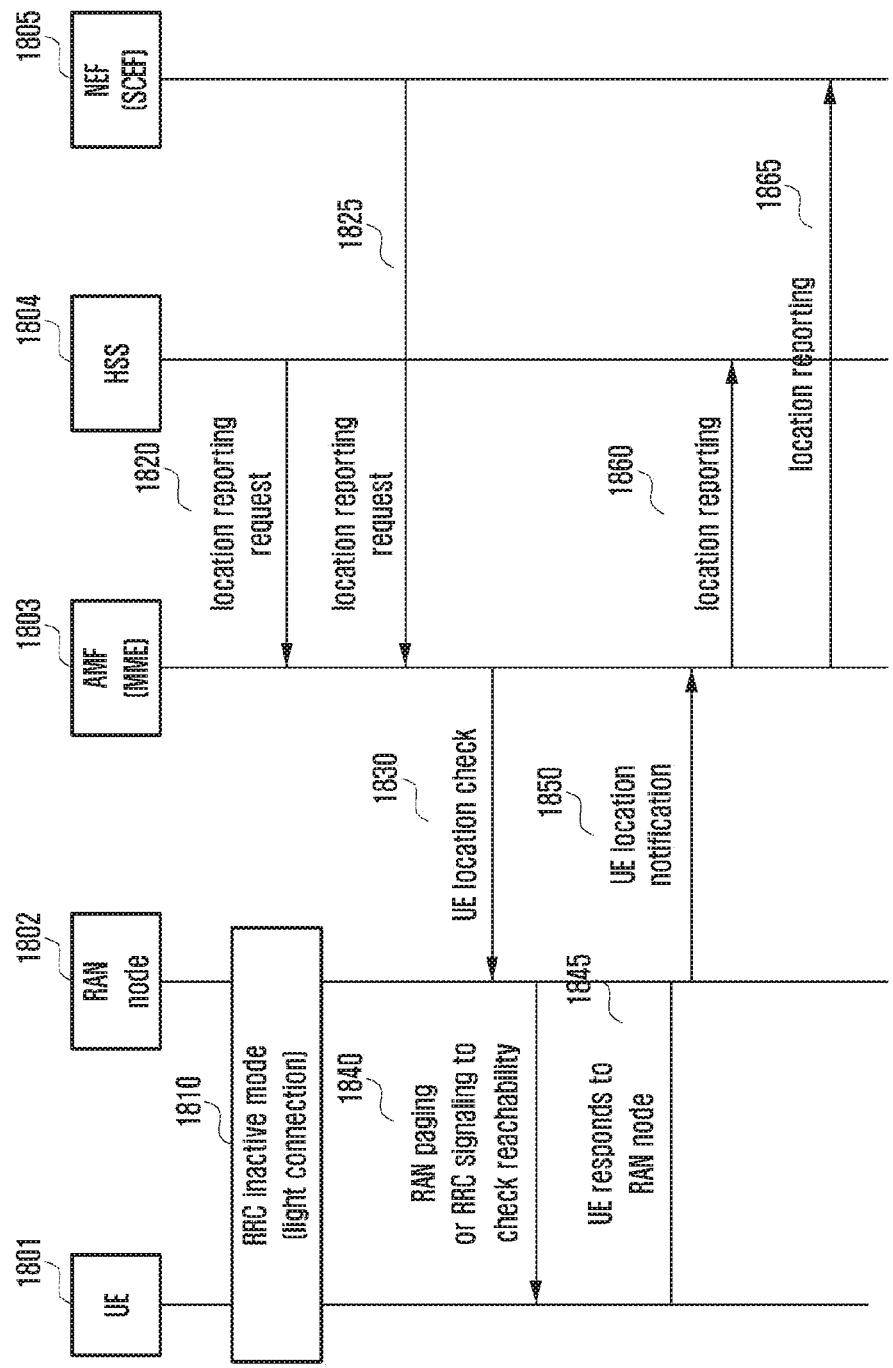
FIG. 18 is a diagram illustrating a method for identifying a location of the terminal when a location reporting request for the terminal is received when the terminal is in the RRC inactive mode or the light connection mode according to an embodiment of the disclosure.

FIG. 18 is a diagram illustrating an operation of triggering a base station to identify a location by an AMF when receiving a location reporting request from an HSS or NEF according to an embodiment of the disclosure.

Referring to FIG. 18, an HSS 1804 may trigger an AMF 1803 to report a location of a terminal 1801 as part of lawful interception. An NEF 1805 may be set to notify the location of the terminal 1801 according to a network capability exposure setting with a $3^{rd}$ party application. When the $3^{rd}$ party application requests the location of the terminal 1801 to the NEF 1805, the NEF 1805 transmits a message for requesting the location of the terminal 1801 to the AMF 1803. Alternatively, the NEF 1805 may transmit a message for requesting event reporting for the location of the terminal 1801 to the AMF 1803. Then, the AMF 1803 notifies the NEF 1805 of the location of the terminal 1801 every time the location of the terminal 1801 is changed. At this time, granularity of the location of the terminal 1801 requested by the HSS 1804 or NEF 1805 may be a cell ID or RAN ID. When the granularity of the location of the terminal 1801 is a tracking area, the AMF 1803 may transfer a tracking area in which the terminal 1801 is located regardless of whether or not the terminal 1801 is in the RRC inactive (or light connection) mode. The present embodiment describes an operation when the AMF 1803 receives a request to report a cell ID or base station ID which is location information of the terminal 1801 managed by a RAN 1802.

In the operation of FIG. 18, it is assumed that the terminal 1801 is in the RRC inactive (or light connection) mode (operation 1810).

The AMF 1803 checks whether the corresponding terminal 1801 is in the RRC inactive (or light connection) mode when receiving a request to report the location of the terminal 1801 from the HSS 1804 or NEF 1805 in operation 1820 or 1825. Even when the base station 1802 does not notify that the terminal 1801 entered the RRC inactive (or light connection) mode, in the case in which the terminal 1801 notifies the AMF 1803 of capability for the RRC inactive (or light connection) mode when performing registration, the AMF 1803 may guess that the terminal 1801 is in the RRC inactive (or light connection) mode. Alternatively, the AMF 1803 may determine that the corresponding terminal 1801 is in the RRC active (or light connection) mode when the terminal 1801 having capability for the RRC inactive (or light connection) mode stays in the CN-connected state for a specific time or longer. Accordingly, the AMF 1803 may perform the following procedures. Alternatively, the AMF 1803 may perform the following procedures in a state in which the AMF 1803 does not know that the terminal 1801 is in the RRC inactive mode at all.

1. In operation 1830, the AMF 1803 transmits a message for requesting identification of a location of the terminal 1801 to the RAN 1802.

This message may be a message through an NG2 interface between the RAN 1802 and the AMF 1803. This message may be a request to the RAN 1802 for checking reachability of the terminal 1801.

In the 4G system, the message may mean a new S1AP message between the eNB 1802 and the MME 1803. This message may be a request to the eNB 1802 for checking reachability of the terminal 1801 in the RRC inactive (or light connection) mode.

2. In operation 1840, the base station 1802 transmits RAN paging or RRC signaling for checking reachability of the terminal 1801 to the terminal 1801. The RRC signaling for checking reachability of the terminal 1801 may mean signaling of not triggering an operation in which the terminal 1801 enters the RRC connected state and establishes all data radio bearers. The RRC signaling may merely be a message for checking whether or not the terminal 1801 is reachable in the current RAN paging area.

When the base station 1802 knows the current location of the terminal 1801, or the location of the terminal 1801 is identified quite recently, the base station 1802 does not transmit the RRC message to the terminal 1801 but immediately sends the location of the terminal 1801 to the AMF 1803 in operation 1850.

Alternatively, the base station 1802 does not transmit the RRC message to the terminal 1801, and may send the last known location of the terminal 1801 previously identified by the base station 1802 to the AMF 1803 in operation 1850. At this time, a time (time stamp) at which the last known location is identified is sent together to notify how old the information is and how valid the information is. In other words, the procedure in which the base station 1802 wakes up (pages) the terminal 1801 to identify the location of the terminal 1801 in the RRC inactive state may be omitted.

3. In operation 1845, the terminal 1801 transmits the RRC message including a cell ID of a cell in which the terminal 1801 currently camps and a base station ID to the RAN 1802 according to the RRC message transmitted from the RAN 1802.

When the base station 1802 transmits the RAN paging, the terminal 1801 may transmit the RRC signaling for entering the RRC connected state to the base station 1802 to activate all data radio bearers. Through the signaling, the base station 1802 may obtain the cell ID of the cell in which the terminal 1801 currently camps.

Alternatively, when the base station 1802 transmits the RRC signaling for checking reachability of the terminal 1801, the terminal resumes the RRC connection and need not establish a data radio bearer. Thus, the terminal 1801 may transmit a cell ID of a cell in which the terminal 1801 camps and a base station ID to the RAN 1802 through the RRC signaling for notifying reachability of the terminal 1801.

4. In operation 1850, the base station 1802 sends the location (i.e., a cell ID of a cell in which the terminal 1801 currently camps and a base station ID or last known location information of the terminal 1801 that the base station 1802 has) of the terminal 1801 obtained in operation 1845 to the AMF 1803. This message may be a response message for the message in operation 1830.

5. In operation 1860 or 1865, the AMF 1803 reports the received location information of the terminal 1801 to the HSS 1804 or NEF 1805. As a detail embodiment, the AMF 1803 may interpret the received location information of the terminal 1801 as a geographical region, that is, a zip code, a postal code, or GPS information and transfer the interpreted information to the NEF 1805, and the NEF 1805 may transfer the interpreted information to a $3^{rd}$ party application server. As another example, when the AMF 1803 identifies the location of the terminal 1801 as a candidates list of cell ID, an intermediate value of the cell location may be derived as a geographical region information value and transferred to the NEF 1805 or HSS 1804. As another example, the AMF 1803 sends the location of the terminal 1801 identified through the above procedure to the NEF 1805 or HSS 1804, and the NEF 1805 or HSS 1804 may interpret the corresponding information as geographical region information (e.g., zip code, postal code, civic address, and GPS information). This is to hide the cell or base station ID used in the network from an external 3rd party. The NEF 1805 or HSS 1804 may transfer the geographical region information mapped as described above to the $3^{rd}$ party application or the location management server.

In detailed embodiments of the disclosure described above, components included in the disclosure have been expressed in the singular or plural according to the suggested detailed embodiment. However, the expression in the singular or plural is appropriately selected for the situation suggested for convenience of explanation, and the disclosure is not limited to a single component or a plurality of components. Even the components expressed in the plural may be configured as a single component, or even the component expressed in the singular may be configured as plural components.

While the disclosure has been described in connection with the detailed embodiments thereof, various modifications can be made without departing from the scope of the disclosure. Therefore, the scope of the disclosure should not be construed as being limited to the described embodiments but be defined by the appended claims as well as equivalents thereto.

Figure 19:
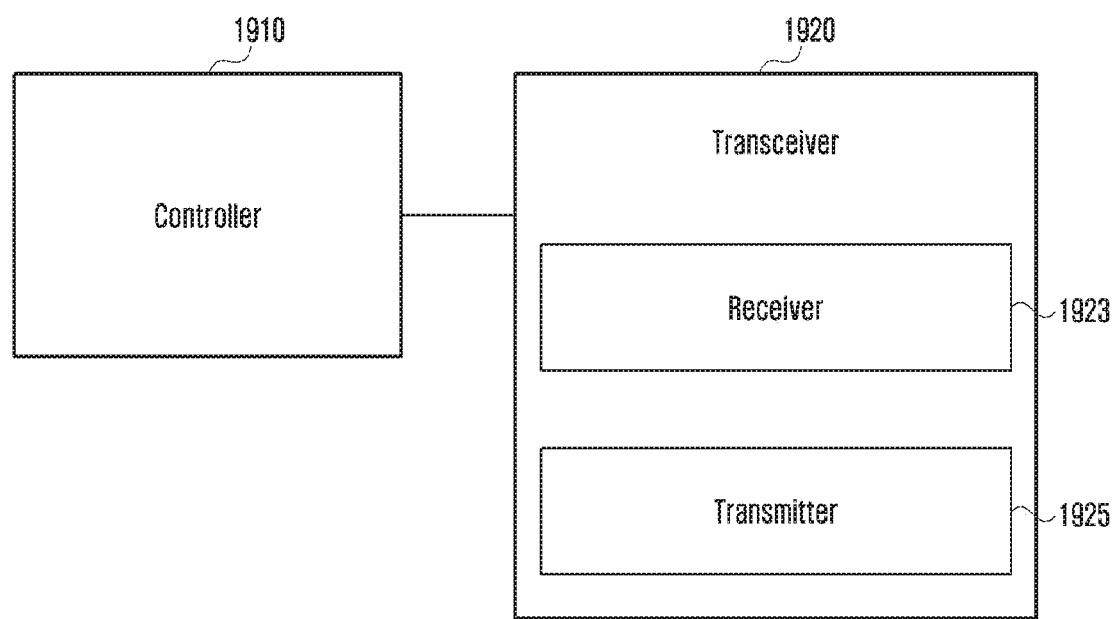
FIG. 19 is a diagram illustrating a configuration of a terminal according to an embodiment of the disclosure.

FIG. 19 is a diagram illustrating a configuration of a terminal according to an embodiment of the disclosure.

Referring to FIG. 19, the terminal according to an embodiment of the disclosure may include a transceiver 1920 and a controller 1910 controlling an overall operation of the terminal. The transceiver 1920 may include a transmitter 1923 and a receiver 1925.

The transceiver 1920 may transmit and receive a signal to and from other network entities.

The controller 1910 may control the terminal to perform any one operation of the embodiments described above. Meanwhile, the controller 1910 and the transceiver 1920 need not necessarily be implemented as separate modules, but may be implemented as one component like a single chip. Further, the controller 1910 and the transceiver 1920 may be electrically connected with each other. The controller 1910 may be, for example, a circuit, an application-specific circuit, or at least one processor. Further, operations of the terminal may be realized by including a memory device storing a corresponding program code in any component in the terminal.

Figure 20:
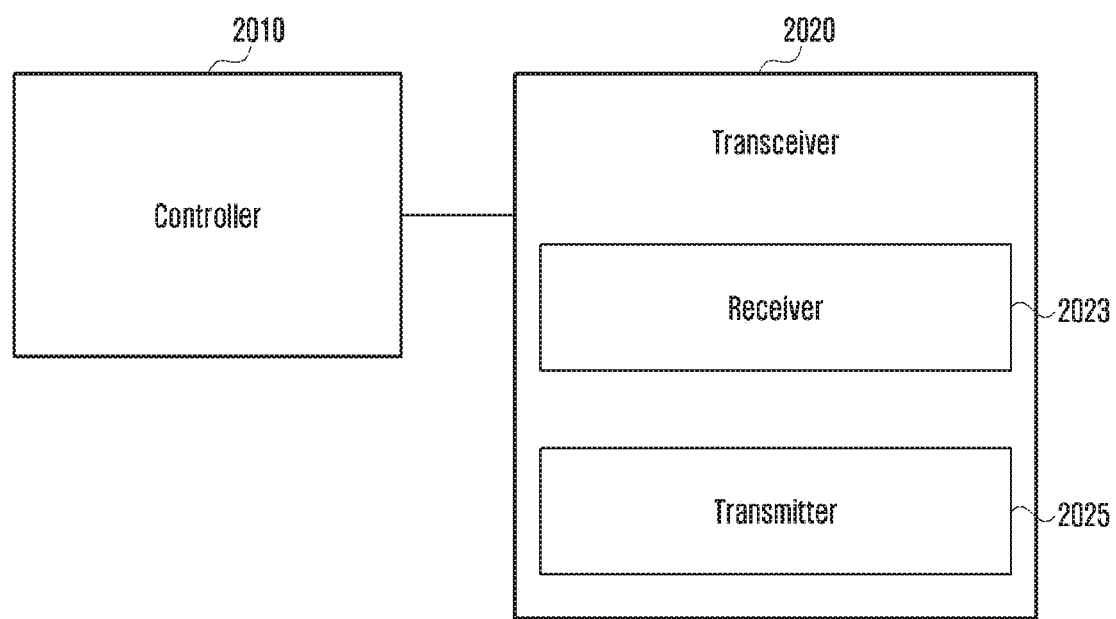
FIG. 20 is a diagram illustrating a configuration of a base station according to an embodiment of the disclosure.

FIG. 20 is a diagram illustrating a configuration of a base station according to an embodiment of the disclosure.

Referring to FIG. 20, the base station according to an embodiment of the disclosure may include a transceiver 2020 and a controller 2010 controlling an overall operation of the base station. The transceiver 2020 may include a transmitter 2023 and a receiver 2025.

The transceiver 2020 may transmit and receive a signal to and from other network entities.

The controller 2010 may control the base station to perform any one operation of the embodiments described above. Meanwhile, the controller 2010 and the transceiver 2020 need not necessarily be implemented as separate modules, but may be implemented as one component like a single chip. Further, the controller 2010 and the transceiver 2020 may be electrically connected with each other. The controller 2010 may be, for example, a circuit, an application-specific circuit, or at least one processor. Further, operations of the base station may be realized by including a memory device storing a corresponding program code in any component in the base station.

Further, although not illustrated, a network entity such as an AMF, an SMF, an UPF, an N3IWF, an HSS, and an NEF according to an embodiment of the disclosure may include a transceiver and a controller controlling an overall operation of the network entity. The transceiver may include a transmitter and a receiver and transmit and receive a signal to and from other network entities. The controller may control the network entity to perform any one operation of the embodiments described above and may be electrically connected with the transceiver.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   receiving, from an access and mobility management function (AMF) entity, a location report request for a first terminal while the first terminal is in radio resource control (RRC) inactive state;
   transmitting, to the AMF entity, a location report including a last known location of the first terminal identified by the base station and a time stamp associated with the last known location of the first terminal, as a response to the location report request for the first terminal;
   receiving, from the AMF entity, a location report request for a second terminal while the second terminal is in RRC inactive state;
   transmitting, a radio access network (RAN) paging for the second terminal based on the location report request for the second terminal;
   determining a current location of the second terminal based on the RAN paging; and
   transmitting, to the AMF entity, a location report including the current location of the second terminal as a response to the location report request for the second terminal.

2. The method of claim 1, wherein the last known location of the first terminal comprises at least one of an identity of a cell for the first terminal, a tracking area identifier for the terminal, or an identifier of a base station serving the first terminal.

3. The method of claim 1, wherein the last known location of the first terminal identified by the base station and the time stamp associated with the last known location of the first terminal are continuously reported whenever the first terminal changes cell.

4. The method of claim 1, wherein the current location of the second terminal comprises at least one of an identity of a cell for the second terminal, a tracking area identifier for the second terminal, or an identifier of a base station serving the second terminal.

5. A method performed by an access and mobility management function (AMF) entity in a wireless communication system, the method comprising:
   transmitting, to a base station, a location report request for a first terminal;
   receiving, from the base station, a location report including a last known location of the first terminal identified by the base station and a time stamp associated with the last known location of the first terminal, as a response to the location report for the first terminal, wherein the location report is a response to the location report request for the first terminal that reaches at the base station while the terminal is in radio resource control (RRC) inactive state;
   transmitting, to the base station, a location report request for a second terminal, wherein the location report request for the second terminal requests the base station to transmit a radio access network (RAN) paging for the second terminal and determine a current location of the second terminal based on the RAN paging, and the location report request for the second terminal reaches at the base station while the terminal is in RRC inactive state; and
   receiving, from the base station, a location report including current location of the second terminal as a response to the location report request for the second terminal.

6. The method of claim 5, wherein the last known location of the first terminal comprises at least one of an identity of a cell for the first terminal, a tracking area identifier for the first terminal, or an identifier of a base station serving the first terminal.

7. The method of claim 5, wherein the last known location of the first terminal identified by the base station and the time stamp associated with the last known location of the first terminal are continuously reported whenever the first terminal changes cell.

8. The method of claim 5, wherein the current location of the second terminal comprises at least one of an identity of a cell for the second terminal, a tracking area identifier for the second terminal, or an identifier of a base station serving the second terminal.

9. A base station in a wireless communication system, the base station comprising:
a transceiver; and
a controller configured to:
control the transceiver to receive, from an access and mobility management function (AMF) entity, a location report request for a first terminal while the first terminal is in radio resource control (RRC) inactive state,
control the transceiver to transmit, to the AMF entity, a location report including a last known location of the first terminal identified by the base station and a time stamp associated with the last known location of the first terminal, as a response to the location report request for the first terminal,
control the transceiver to receive, from the AMF entity, a location report request for a second terminal while the second terminal is in RRC inactive state,
control the transceiver to transmit a radio access network (RAN) paging for the second terminal based on the location report request for the second terminal,
determine a current location of the second terminal based on the RAN paging, and
control the transceiver to transmit, to the AMF entity, a location report including the current location of the second terminal as a response to the location report request for the second terminal.

10. The base station of claim 9, wherein the last known location of the first terminal comprises at least one of an identity of a cell for the first terminal, a tracking area identifier for the terminal, or an identifier of a base station serving the first terminal.

11. The base station of claim 9, wherein the last known location of the first terminal identified by the base station and the time stamp associated with the last known location of the first terminal are continuously reported whenever the first terminal changes cell.

12. The base station of claim 9, wherein the current location of the second terminal comprises at least one of an identity of a cell for the second terminal, a tracking area identifier for the second terminal, or an identifier of a base station serving the second terminal.

13. An access and mobility management function (AMF) entity in a wireless communication system, the AMF entity comprising:
a transceiver; and
a controller configured to:
control the transceiver to transmit, to a base station, a location report request for a first terminal,
control the transceiver to receive, from the base station, a location report including a last known location of the first terminal identified by the base station and a time stamp associated with the last known location of the first terminal, as a response to the location report for the first terminal, wherein the location report is a response to the location report request for the first terminal that reaches at the base station while the terminal is in radio resource control (RRC) inactive state,
control the transceiver to transmit, to the base station, a location report request for a second terminal, wherein the location report request for the second terminal requests the base station to transmit radio access network (RAN) paging for the second terminal and determine a current location of the second terminal based on the RAN paging, and the location report request for the second terminal reaches at the base station while the terminal is in RRC inactive state, and
control the transceiver to receive, from the base station, a location report including current location of the second terminal as a response to the location report request for the second terminal.

14. The access and mobility management entity of claim 13, wherein the last known location of the first terminal comprises at least one of an identity of a cell for the first terminal, a tracking area identifier for the first terminal, or an identifier of a base station serving the first terminal.

15. The access and mobility management entity of claim 13, wherein the last known location of the first terminal identified by the base station and the time stamp associated with the last known location of the first terminal are continuously reported whenever the first terminal changes cell.

16. The access and mobility management entity of claim 13, wherein the current location of the second terminal comprises at least one of an identity of a cell for the second terminal, a tracking area identifier for the second terminal, or an identifier of a base station serving the second terminal.

* * * * *